United States Patent
Handelman et al.

(10) Patent No.: US 6,298,441 B1
(45) Date of Patent: Oct. 2, 2001

(54) SECURE DOCUMENT ACCESS SYSTEM

(75) Inventors: Doron Handelman, Givataim; Moshe Kranc; David Fink, both of Jerusalem; Arnold Zucker, Ramat Modiim; Perry Smith, Jerusalem; Gerson Bar-On, Kohav Hashahar, all of (IL)

(73) Assignee: News Datacom Ltd., Middlesex (GB)

( * ) Notice: Subject to any disclaimer, the term of this patent is extended or adjusted under 35 U.S.C. 154(b) by 0 days.

(21) Appl. No.: 09/115,489

(22) Filed: Jul. 14, 1998

Related U.S. Application Data

(63) Continuation-in-part of application No. 08/925,547, filed on Sep. 8, 1997, which is a continuation of application No. 08/375,995, filed on Jan. 20, 1995, now Pat. No. 5,666,412.

(30) Foreign Application Priority Data

Mar. 10, 1994 (IS) ...................................................... 111151

(51) Int. Cl.⁷ ..................................................... H04L 9/00
(52) U.S. Cl. ........................ 713/185; 713/192; 713/200; 380/231; 380/232; 705/52; 705/55; 705/64; 705/65; 705/67; 705/77
(58) Field of Search ................................. 705/55, 65, 67, 705/52, 64, 77; 713/185, 192; 380/229, 231, 232

(56) References Cited

U.S. PATENT DOCUMENTS

| | | |
|---|---|---|
| 3,859,508 | 1/1975 | Brosow et al. ................. 235/61.7 B |
| 3,996,450 | 12/1976 | Kerkhoff ......................... 235/61.7 B |
| 4,159,417 | 6/1979 | Rubincam . |
| 4,160,242 | 7/1979 | Fowler et al. . |
| 4,290,062 | 9/1981 | Marti et al. . |
| 4,325,078 | 4/1982 | Seaton et al. ........................... 380/16 |
| 4,350,070 | 9/1982 | Bahu . |
| 4,450,535 | 5/1984 | de Pommery et al. .............. 364/900 |
| 4,589,659 | 5/1986 | Yokoi et al. . |
| 4,594,663 | 6/1986 | Nagata et al. ........................ 364/401 |
| 4,597,058 | 6/1986 | Izumi et al. ......................... 364/900 |
| 4,613,901 | 9/1986 | Gilhousen et al. ..................... 380/20 |
| 4,639,225 | 1/1987 | Washizuka . |
| 4,680,459 | 7/1987 | Drexler . |
| 4,709,136 | 11/1987 | Watanabe ............................. 235/379 |
| 4,718,107 | 1/1988 | Hayes ....................................... 455/4 |
| 4,725,977 | 2/1988 | Izumi et al. ......................... 364/900 |
| 4,740,912 | 4/1988 | Witaker . |
| 4,748,668 | 5/1988 | Shamir et al. . |
| 4,751,732 | 6/1988 | Kamitake ............................... 380/20 |
| 4,768,229 | 8/1988 | Banjamin et al. ..................... 380/20 |
| 4,780,791 | 10/1988 | Morita et al. ................... 235/492 X |
| 4,855,725 | 8/1989 | Fernandez . |

(List continued on next page.)

FOREIGN PATENT DOCUMENTS

| | | |
|---|---|---|
| 0562295 | 9/1993 | (EP) . |
| 0683 613 A2 | 11/1995 | (EP) . |
| WO 89/08899 | 9/1989 | (WO) . |

OTHER PUBLICATIONS

G. Monnin, Smart Cards For Conditional Access: A Security and Marketing Tool Smartcrypt: The Pay–TV System From Schlumberger, 18th Int'l TV Symp., Montreux, Switz., Jun. 1993, pp. 743–757.

Primary Examiner—Tod Swann
Assistant Examiner—Paul E. Callahan
(74) Attorney, Agent, or Firm—Ladas and Parry

(57) ABSTRACT

A method for downloading a document via a communications medium operatively associated with a communications interface, the method including receiving the document from the communications medium, placing an information storage smart card in removable operative association with the communications interface, and conditionally transmitting the document from the communications interface to the information storage smart card and storing the document in the information storage smart card. Other related methods and apparatus are also provided.

81 Claims, 13 Drawing Sheets

U.S. PATENT DOCUMENTS

| | | | |
|---|---|---|---|
| 4,870,261 | 9/1989 | Mancini et al. ............... 235/382 |
| 4,882,473 | 11/1989 | Bergeron et al. . |
| 4,908,834 | 3/1990 | Wiedemer ........................ 380/5 |
| 4,917,292 | 4/1990 | Drexler . |
| 4,937,821 | 6/1990 | Boulton . |
| 4,961,142 | 10/1990 | Elliott et al. ................ 364/408 |
| 4,985,697 | 1/1991 | Boulton . |
| 4,993,066 | 2/1991 | Jenkins ........................ 380/16 |
| 5,010,571 | 4/1991 | Katznelson .................... 380/4 |
| 5,048,085 * | 9/1991 | Abraham et al. ............. 380/23 |
| 5,060,079 | 10/1991 | Rufus-Isaacs .................. 348/1 |
| 5,065,429 | 11/1991 | Lang ............................. 380/25 |
| 5,111,504 | 5/1992 | Esserman et al. ............ 380/21 |
| 5,113,178 | 5/1992 | Yasuda et al. . |
| 5,167,508 | 12/1992 | McTaggart . |
| 5,214,699 | 5/1993 | Monroe et al. .............. 380/23 |
| 5,239,665 | 8/1993 | Tsuchiya . |
| 5,243,175 | 9/1993 | Kato .............................. 235/435 |
| 5,272,753 | 12/1993 | Nakayama et al. .......... 380/23 |
| 5,282,249 | 1/1994 | Cohen et al. ................ 380/23 |
| 5,285,496 | 2/1994 | Frank et al. . |
| 5,311,396 | 5/1994 | Steffen ......................... 361/736 |
| 5,319,705 | 6/1994 | Halter et al. ................. 380/4 |
| 5,337,358 | 8/1994 | Alexrod et al. .............. 380/23 |
| 5,339,091 | 8/1994 | Yamazaki et al. . |
| 5,371,493 | 12/1994 | Sharpe et al. . |
| 5,413,486 | 5/1995 | Burrows . |
| 5,428,685 | 6/1995 | Kadooka et al. ............. 380/25 |
| 5,434,395 | 7/1995 | Storck et al. ................ 235/380 |
| 5,438,344 | 8/1995 | Oliva . |
| 5,461,217 | 10/1995 | Claus ........................... 235/380 |
| 5,466,158 | 11/1995 | Smith, III . |
| 5,469,506 | 11/1995 | Berson et al. . |
| 5,471,045 | 11/1995 | Geronimi .................... 235/492 |
| 5,481,609 | 1/1996 | Cohen et al. ................ 380/16 |
| 5,484,292 | 1/1996 | McTaggart . |
| 5,495,581 * | 2/1996 | Tsai ............................. 395/154 |
| 5,509,073 | 4/1996 | Monnin ....................... 380/20 |
| 5,526,428 | 6/1996 | Arnold ......................... 380/25 |
| 5,533,124 | 7/1996 | Smith et al. . |
| 5,534,857 | 7/1996 | Laing et al. .............. 340/825.34 |
| 5,534,888 | 7/1996 | Lebby et al. . |
| 5,553,155 | 9/1996 | Kuhns et al. ........... 340/825.31 X |
| 5,555,446 | 9/1996 | Jasinski . |
| 5,559,885 | 9/1996 | Drexler et al. .............. 380/23 |
| 5,574,567 * | 11/1996 | Cookson et al. ............. 386/46 |
| 5,592,619 | 1/1997 | Shoa ............................ 395/186 |
| 5,625,404 | 4/1997 | Grady et al. . |
| 5,629,508 | 5/1997 | Findley, Jr. et al. ........ 235/38 R |
| 5,630,103 | 5/1997 | Smith et al. . |
| 5,661,635 | 8/1997 | Huffman et al. . |
| 5,663,748 | 9/1997 | Huffman et al. . |
| 5,689,648 | 11/1997 | Diaz et al. . |
| 5,697,793 | 12/1997 | Huffman et al. . |
| 5,979,773 | 11/1999 | Findley, Jr. et al. ........ 235/492 |
| 5,986,690 * | 11/1999 | Hendricks ..................... 348/7 |

\* cited by examiner

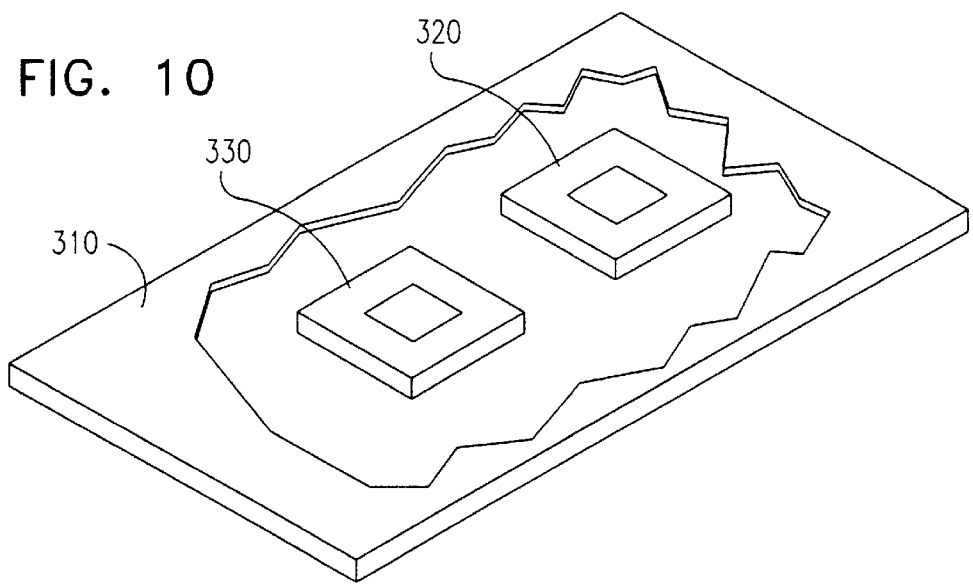

FIG. 10

```
┌─────────────────────────────────────┐
│ INSERT AN IC CARD INTO AN IC CARD   │
│ RECEPTACLE FORMING PART OF AN IC    │
│ CARD READER AND WRITER COUPLED TO A │
│ CATV DECODER                        │
└─────────────────────────────────────┘
                  │
                  ▼
┌─────────────────────────────────────┐
│ ADDRESS THE IC CARD TO ENABLE ACCESS│
│ TO VIDEO DATA STORED IN A MEMORY    │
│ EMBODIED IN THE IC CARD BY          │
│ COMMUNICATING ANY OF SEEDS, KEYS AND│
│ ACCESS CONTROL ALGORITHMS WITH THE  │
│ CATV DECODER                        │
└─────────────────────────────────────┘
                  │
                  ▼
┌─────────────────────────────────────┐
│   READ THE DATA STORED IN THE MEMORY│
└─────────────────────────────────────┘
                  │
                  ▼
┌─────────────────────────────────────┐
│   PROVIDE THE DATA TO A TELEVISION  │
└─────────────────────────────────────┘
```

FIG. 11

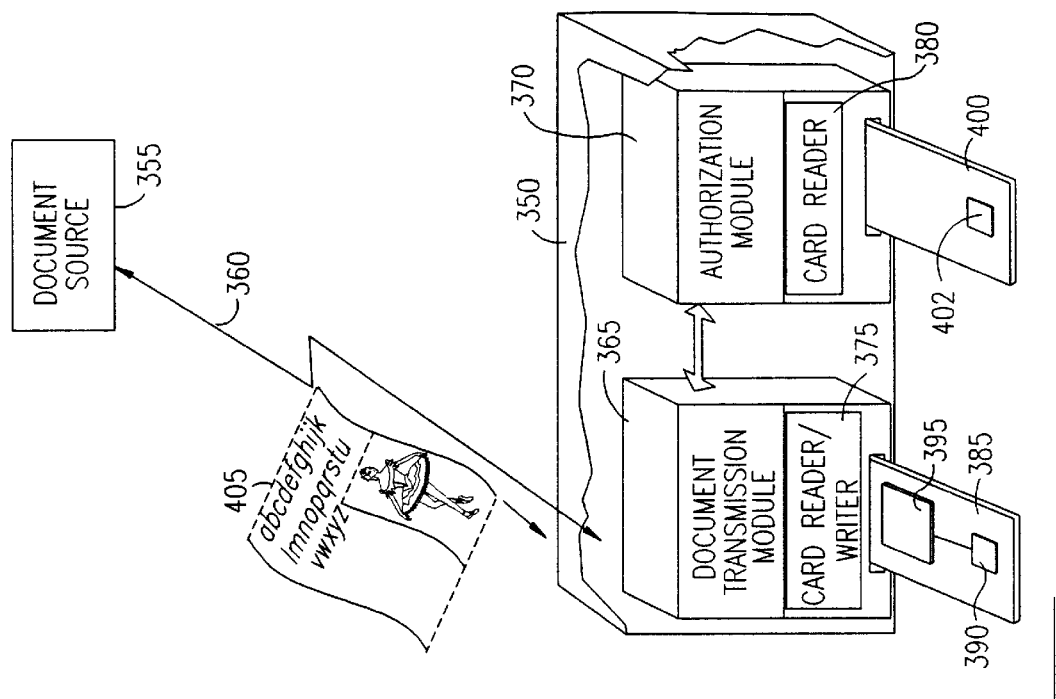
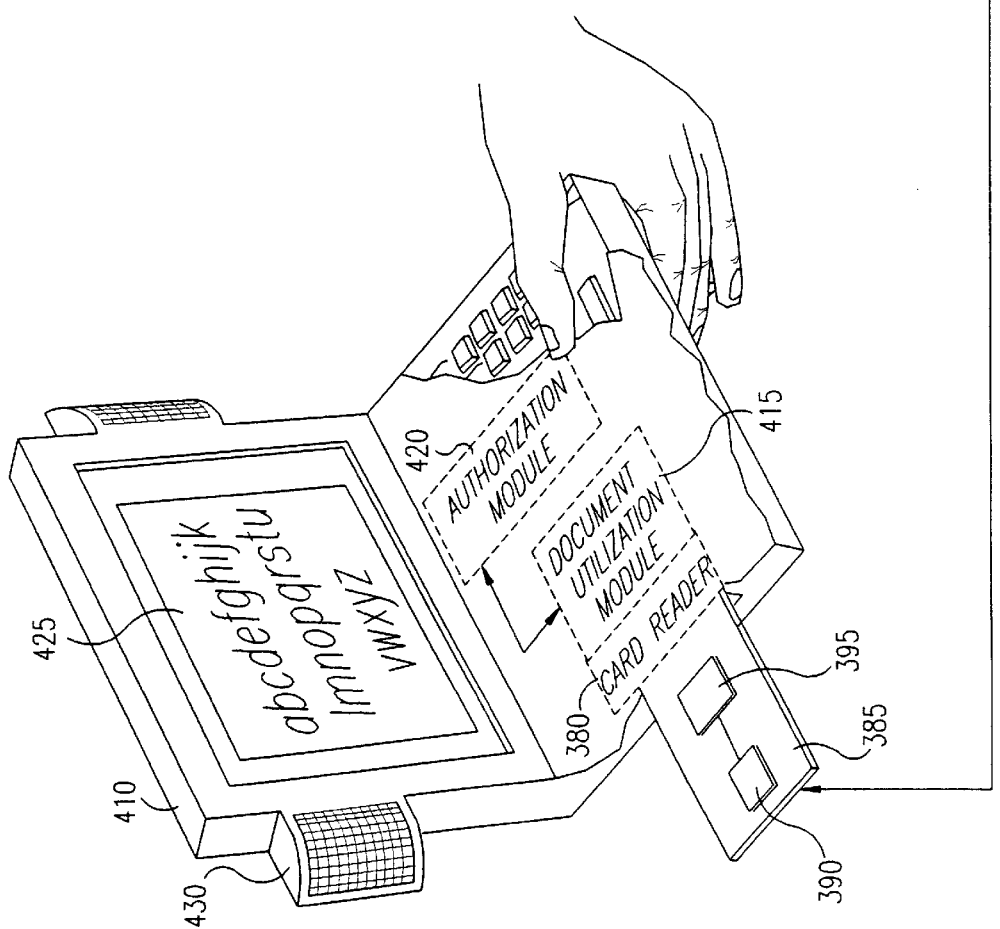
FIG. 12

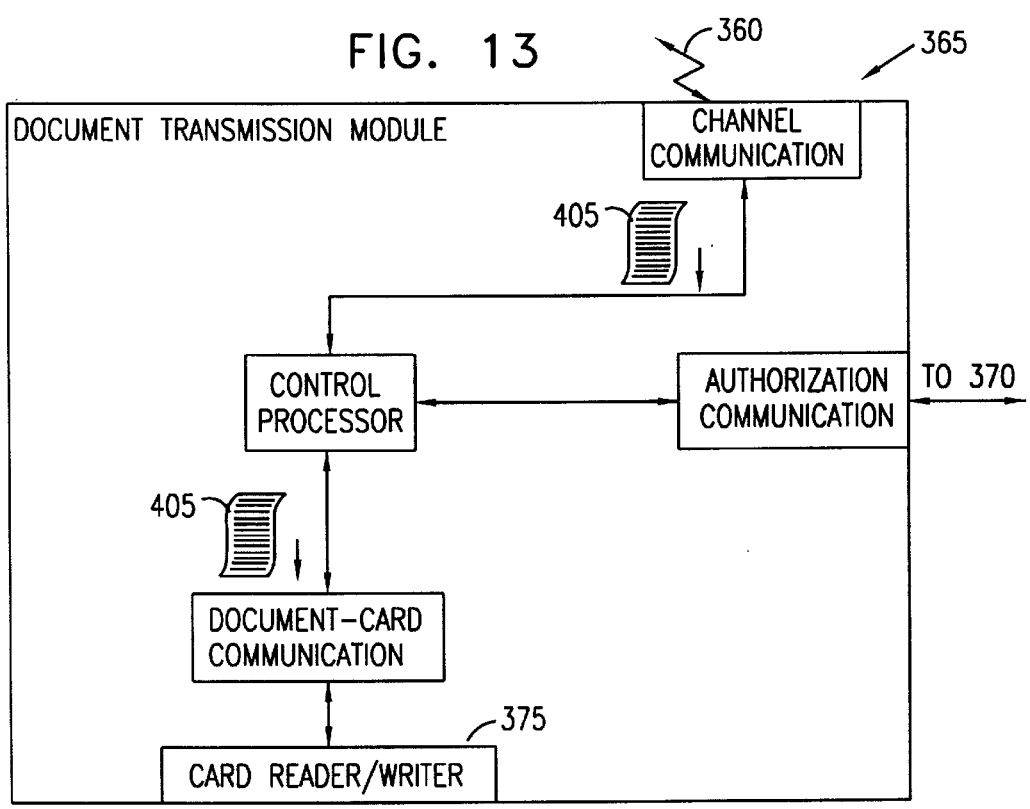
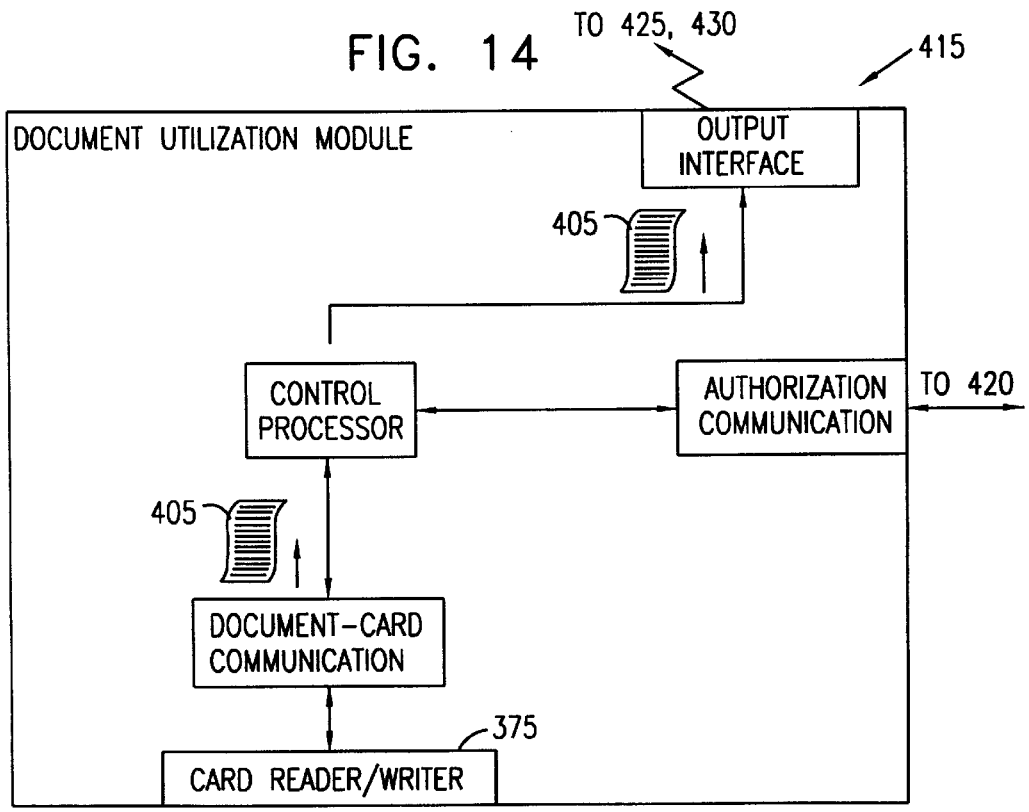

SECURE DOCUMENT ACCESS SYSTEM

FIELD OF THE INVENTION

The present invention is a continuation-in-part of Ser. No. 08/925,547 filed Sep. 8, 1997, which is a continuation of Ser. No. 08/375,995, filed Jan. 20, 1995, now U.S. Pat. No. 5,666,412.

The present invention relates to secure access systems generally and more particularly to secure access systems which employ integrated circuit cards, especially to secure access systems for electronic books.

BACKGROUND OF THE INVENTION

Access systems generally provide access to restricted means, such as communication systems and data, or to restricted areas such as buildings and departments. There are known in the art access systems which employ integrated circuit (IC) cards, or as more commonly referred to "smart cards", to provide secure access to restricted means or areas.

Smart cards are employed in systems such as pay TV systems and telephone systems. Such systems generally employ one card per unit which is to be accessed, whereby access is enabled whenever a valid smart card is inserted in a card slot.

U.S. Pat. No. 4,709,136 to Watanabe describes an IC card reader/writer apparatus which includes at least two contactors in which IC cards are inserted, respectively, card detecting means for detecting that at least two IC cards have been loaded, and collating means verifying that correct cipher codes of the two IC cards coincide with those inputted externally, respectively, wherein access to the contents stored in the IC cards is allowed only when the collation results in coincidence.

U.S. Pat. No. 4,594,663 to Nagata et al describes a credit transaction processing system which processes data related to a commodity entered into by using a card owned by a customer and a recording card owned by a store.

U.S. Pat. No. 5,010,571 to Katznelson describes a system for controlling and accounting for retrieval of data from a CD-ROM memory containing encrypted data files from which retrieval must be authorized.

Various aspects of electronic book technology, representing an attempt to instantiate various qualities of paper-based books in an electronic device, are known in the art. Related technologies include technologies for storing, retrieving, and updating book-like documents in electronic form. The following references described some aspects of electronic book and related technology:

U.S. Pat. No. 4,159,417 to Rubincam;
U.S. Pat. No. 4,160,242 to Fowler et al;
U.S. Pat. No. 4,290,062 to Marti et al;
U.S. Pat. No. 4,350,070 to Bahu;
U.S. Pat. No. 4,589,659 to Yokoi et al;
U.S. Pat. No. 4,639,225 to Washizuka;
U.S. Pat. No. 4,680,459 to Drexler;
U.S. Pat. No. 4,740,912 to Whitaker;
U.S. Pat. No. 4,855,725 to Fernandez;
U.S. Pat. No. 4,917,292 to Drexler;
U.S. Pat. No. 4,937,821 to Boulton;
U.S. Pat. No. 4,985,697 to Boulton;
U.S. Pat. No. 5,113,178 to Yasuda et al;
U.S. Pat. No. 5,167,508 to McTaggart;
U.S. Pat. No. 5,239,665 to Tsuchiya;
U.S. Pat. No. 5,285,496 to Frank et al;
U.S. Pat. No. 5,339,091 to Yamazaki et al;
U.S. Pat. No. 5,371,493 to Sharpe et al;
U.S. Pat. No. 5,413,486 to Burrows et al;
U.S. Pat. No. 5,438,344 to Oliva;
U.S. Pat. No. 5,466,158 to Smith III;
U.S. Pat. No. 5,469,506 to Berson et al;
U.S. Pat. No. 5,484,292 to McTaggart;
U.S. Pat. No. 5,533,124 to Smith et al;
U.S. Pat. No. 5,534,888 to Lebby et al;
U.S. Pat. No. 5,555,446 to Jasinski;
U.S. Pat. No. 5,625,404 to Grady et al;
U.S. Pat. No. 5,630,103 to Smith et al;
U.S. Pat. No. 5,661,635 to Huffman et al;
U.S. Pat. No. 5,663,748 to Huffman et al;
U.S. Pat. No. 5,689,648 to Diaz et al;
U.S. Pat. No. 5,697,793 to Huffman et al; and
European Patent Application 0 683 613 A2, assigned to AT&T Corp.

The disclosures of all references mentioned above and throughout the present specification are hereby incorporated herein by reference.

SUMMARY OF THE INVENTION

The present invention seeks to provide access systems having improved security and flexible applications.

The term "access systems" is used throughout the specification and claims in a broad sense to include systems which allow controlled access to communication apparatus, software programs, restricted areas, such as buildings, terrain and departments in a plant, television and cable television transmissions, video programs, audio programs, computer data and electronic mail and voice information.

The present invention particularly seeks to provide access systems for use with an electronic book system, in which information is typically loaded into an information storage medium such as a smart card, typically for viewing in a viewing device. Typically, loading of information into the information storage medium is performed in a first device, while the viewing device typically comprises a separate device, typically a device not capable of loading information into the information storage medium or not connected to an appropriate external source of information.

It is appreciated that functions described throughout the present specification and claims as being performed separately in a first device and a viewing device may alternatively be performed in a single device combining the capabilities of the first device and the viewing device.

The term "smart card" is used herein interchangeably with the term "IC card", and is meant to include any device of whatever external form, whether the form of a card or another form such as a key, having internal structure and characteristics similar to those of an IC card.

The term "CATV systems" is used throughout the specification and claims in a broad sense to include any form of pay TV systems which are either one-way systems or two-way systems utilizing cable communication networks, satellite communication networks, telephone communication networks or any combination thereof.

There is thus provided in accordance with a preferred embodiment of the present invention a method for downloading a document via a communications medium operatively associated with a communications interface, the method including receiving the document from the communications medium, placing an information storage smart card in removable operative association with the communications interface, and conditionally transmitting the document from the communications interface to the information storage smart card and storing the document in the information storage smart card.

Further in accordance with a preferred embodiment of the present invention the conditionally transmitting step includes comparing a price associated with the document to a spending limit and transmitting the document only if the price is in accordance with the spending limit.

Still further in accordance with a preferred embodiment of the present invention the document includes at least one of the following: text, graphics, sound, an animated scene, multimedia information, hypertext information, navigation information, a map, a book, a periodical, and a game.

Additionally in accordance with a preferred embodiment of the present invention the method includes the step of sending a message from the information storage smart card to an information storage facility, wherein the message includes at least one of the following: a request for information, and status information.

Moreover in accordance with a preferred embodiment of the present invention the message is encrypted.

Further in accordance with a preferred embodiment of the present invention the message is signed.

Still further in accordance with a preferred embodiment of the present invention the method also includes placing an authorization smart card in removable operative association with the communications interface, and the conditionally transmitting step includes transmitting the document to the information storage smart card only if the authorization smart card is authorized to access the item of information.

Additionally in accordance with a preferred embodiment of the present invention the information storage smart card is paired with the communications interface.

Moreover in accordance with a preferred embodiment of the present invention the method also includes removing the information storage smart card from operative association with the communications interface, placing the information storage smart card in operative association with an information access device, and utilizing the document stored in the information storage smart card with the information access device.

Further in accordance with a preferred embodiment of the present invention the information access device includes at least one of the following a document display device, a personal computer, a personal communications device, a personal display device, a television, a radio, a sound system, and a guidance system.

Still further in accordance with a preferred embodiment of the present invention the utilizing step includes conditionally utilizing the document.

Additionally in accordance with a preferred embodiment of the present invention the utilizing step includes formatting the document.

Moreover in accordance with a preferred embodiment of the present invention the formatting step includes formatting based on formatting information stored in the information storage smart card.

Further in accordance with a preferred embodiment of the present invention the formatting information is included in the document.

Still further in accordance with a preferred embodiment of the present invention the formatting information includes decryption information.

Additionally in accordance with a preferred embodiment of the present invention the formatting step includes formatting based on formatting information stored in the information access device.

Moreover in accordance with a preferred embodiment of the present invention the method also includes updating the formatting information based on formatting update information stored in the information storage smart card.

Further in accordance with a preferred embodiment of the present invention the conditionally transmitting step includes transmitting the information to the information storage smart card only if the information storage smart card is authorized for use in the communications interface.

Still further in accordance with a preferred embodiment of the present invention the conditionally transmitting step includes transmitting the document to the information storage smart card only if the information storage smart card is authorized to receive the document.

Additionally in accordance with a preferred embodiment of the present invention the conditionally transmitting step includes transmitting the document to the information storage smart card upon external authorization.

Further in accordance with a preferred embodiment of the present invention the document is associated with a geographical region, and the conditionally transmitting step includes transmitting the document to the information storage smart card if the information storage smart card is associated with the geographical region.

Still further in accordance with a preferred embodiment of the present invention the document is associated with a geographical region, and the conditionally transmitting step includes preventing transmission of the document to the information storage smart card if the information storage smart card is associated with the geographical region.

Additionally in accordance with a preferred embodiment of the present invention the document includes authorization information including information indicating whether the information storage smart card is authorized to use the document.

Moreover in accordance with a preferred embodiment of the present invention the conditionally transmitting step includes transmitting the information to the information storage smart card only if the information storage smart card is authorized to use the document in accordance with the authorization information.

Further in accordance with a preferred embodiment of the present invention the storing includes updating previously stored information stored in the information storage smart card.

Still further in accordance with a preferred embodiment of the present invention the updating step includes at least one of the following: replacing the previously stored information, changing the previously stored information, deleting the previously stored information, and supplementing the previously stored information.

Additionally in accordance with a preferred embodiment of the present invention the formatting step includes at least one of the following: updating decryption information, and updating general formatting information.

Moreover in accordance with a preferred embodiment of the present invention the method also includes placing an auxiliary card in removable operative association with the information access device.

Further in accordance with a preferred embodiment of the present invention the auxiliary card includes an authorization card, and the utilizing step includes utilizing the document in the information storage smart card only if the authorization card is authorized to access the document.

Still further in accordance with a preferred embodiment of the present invention the document stored in the information storage smart card includes a plurality of stored documents, and the utilizing step includes utilizing at least one of the plurality of stored documents only if the authorization card is authorized to access the at least one of the plurality of stored documents.

Additionally in accordance with a preferred embodiment of the present invention the authorization card includes an authorization smart card.

Moreover in accordance with a preferred embodiment of the present invention the plurality of stored documents includes a plurality of versions of a single document.

Further in accordance with a preferred embodiment of the present invention each one of the plurality of versions is encrypted according to at least one encryption parameter which differs for each one of the plurality of versions.

Still further in accordance with a preferred embodiment of the present invention the auxiliary card includes an authorization card, and the utilizing step includes utilizing the document stored in the information storage smart card only if the authorization card is authorized to access the document.

Additionally in accordance with a preferred embodiment of the present invention the document includes parental control information, and the conditionally transmitting includes transmitting only in accordance with the parental control information.

Moreover in accordance with a preferred embodiment of the present invention the parental control information is associated with only a portion of the document, and the conditionally transmitting step includes transmitting the portion of the document only in accordance with the parental control information.

There is also provided in accordance with another preferred embodiment of the present invention a method for downloading a document via a communications medium attached to a communications interface, the method including receiving the document from the communications medium, placing an information storage smart card in removable operative association with the communications interface, placing an auxiliary card in removable operative association with the communications interface, transmitting the document from the communications interface to the information storage smart card and storing the information in the information storage smart card, and utilizing the document stored in the information storage smart card.

There is also provided in accordance with still another preferred embodiment of the present invention a method for downloading a document via a communications medium attached to a communications interface, the method including receiving, via a communications network, an authorization to receive the document via the communications medium, placing an information storage smart card in removable operative association with the communications interface, receiving the document from the communications medium, and conditionally transmitting the document, in accordance with the authorization, from the communications interface to the information smart card and storing the information in the information storage smart card.

Further in accordance with a preferred embodiment of the present invention the step of receiving an authorization includes performing an authentication method.

Still further in accordance with a preferred embodiment of the present invention the authentication method includes a zero-knowledge authentication method.

Additionally in accordance with a preferred embodiment of the present invention the zero-knowledge authentication method includes a Fiat-Shamir authentication method.

There is also provided in accordance with another preferred embodiment of the present invention a document downloading system for downloading a document via a communications medium operatively associated with a communications interface, the system including document receiving apparatus for receiving the document from the communications medium, and a document transmission module adapted to receive an information storage smart card in removable operative association therewith and to conditionally transmit the document to the information storage smart card for storage therein.

There is also provided in accordance with still another preferred embodiment of the present invention a document downloading system for downloading a document via a communications medium attached to a communications interface, the system including document receiving apparatus for receiving the document from the communications medium, a document transmission module adapted to receive an information storage smart card in removable operative association therewith and to transmit the document to the information storage smart card for storage therein, an auxiliary card module adapted to receive an auxiliary card in removable operative association therewith, and utilization apparatus for utilizing the document stored in the information storage smart card.

There is also provided in accordance with yet another preferred embodiment of the present invention a document downloading system for downloading a document via a communications medium attached to a communications interface, the system including authorization apparatus for receiving, via a communications network, an authorization to receive the document via the communications medium, a document transmission module adapted to receive an information storage smart card in removable operative association therewith and to transmit the document, in accordance with the authorization, to the information storage smart card for storage therein.

BRIEF DESCRIPTION OF THE DRAWINGS

The present invention will be understood and appreciated more fully from the following detailed description, taken in conjunction with the drawings in which:

FIG. 10 is an illustration of a smart card comprising two integrated circuits, the smart card being constructed and operative in accordance with an alternative preferred embodiment of the present invention;

FIG. 11 is a simplified flowchart illustration of a preferred method of utilizing a smart card such as the smart card of FIG. 9;

FIG. 12 is a simplified partly pictorial, partly block diagram illustration of a document conditional access system, constructed and operative in accordance with another preferred embodiment of the present invention;

FIG. 13 is a simplified block diagram illustration of a preferred implementation of the document transmission module of FIG. 12;

FIG. 14 is a simplified block diagram illustration of a preferred implementation of the document utilization module of FIG. 12.

DETAILED DESCRIPTION OF PREFERRED EMBODIMENTS

Figure 1:
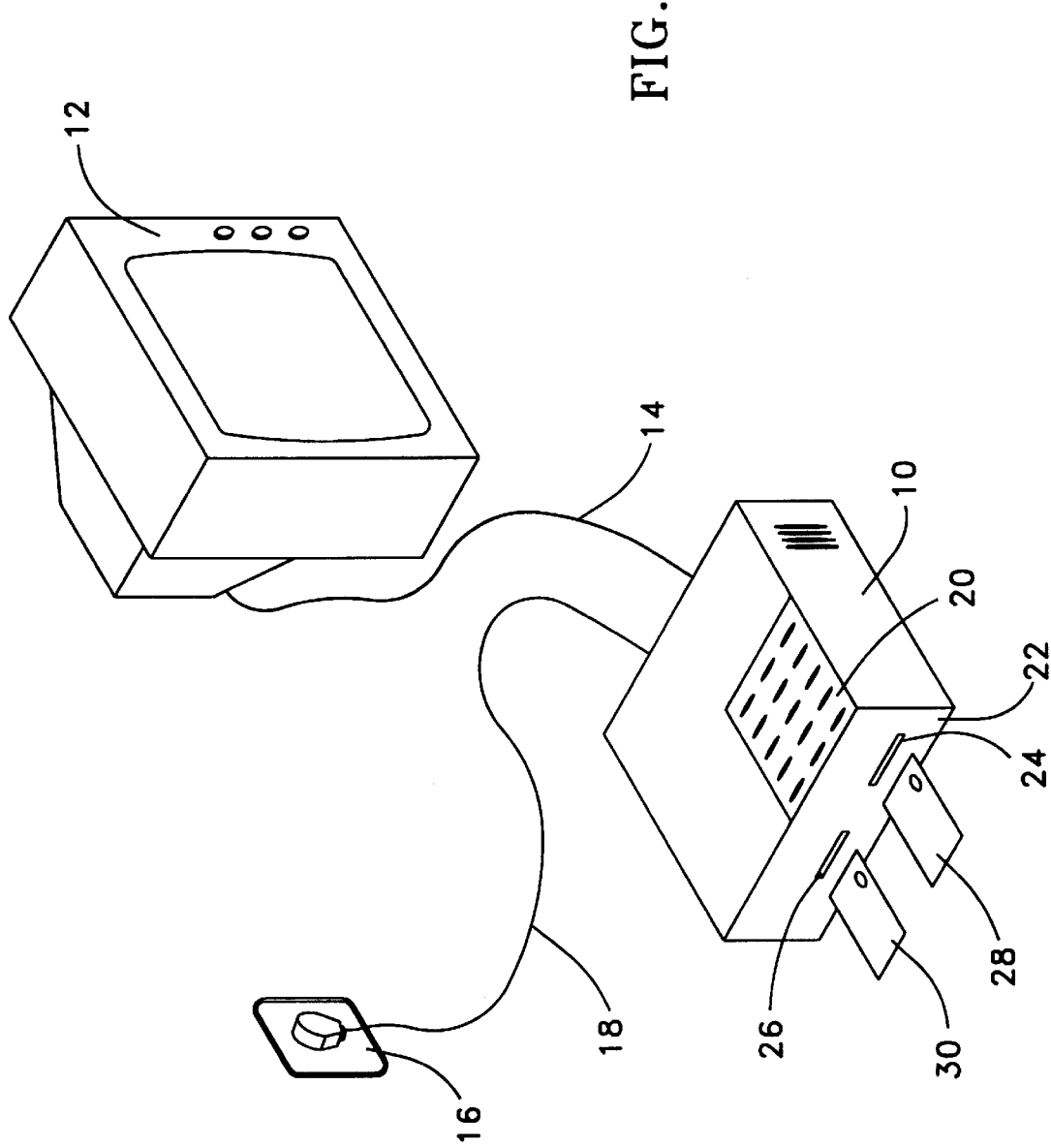
FIG. 1 is a generalized block diagram illustration of a parental control system in a CATV system constructed and operative in accordance with a preferred embodiment of the present invention.

Reference is now made to FIG. 1, which is a generalized illustration of a parental control system in a CATV system constructed and operative in accordance with a preferred embodiment of the present invention.

At a subscriber location a CATV decoder 10 is coupled to a television 12 via a coaxial cable 14. CATV decoder 10 is preferably fed from a CATV network (not shown) via a cable outlet 16 and a coaxial cable 18. CATV decoder 10 is preferably operated by a remote control (not shown) or a built-in keypad 20.

CATV decoder includes, at a front panel 22, two card receptacles 24 and 26. Preferably, card receptacles 24 and 26 may accept smart cards 28 and 30 respectively. Smart cards 28 and 30 are hereinafter referred to as the main card and the parent card respectively. CATV decoder 10 is operative to decrypt CATV programs which are transmitted from a remote location under control of the main card and the parent card which are operative to participate in any of an authentication procedure, a validation procedure and a verification procedure and to provide program entitlements.

Figure 2:
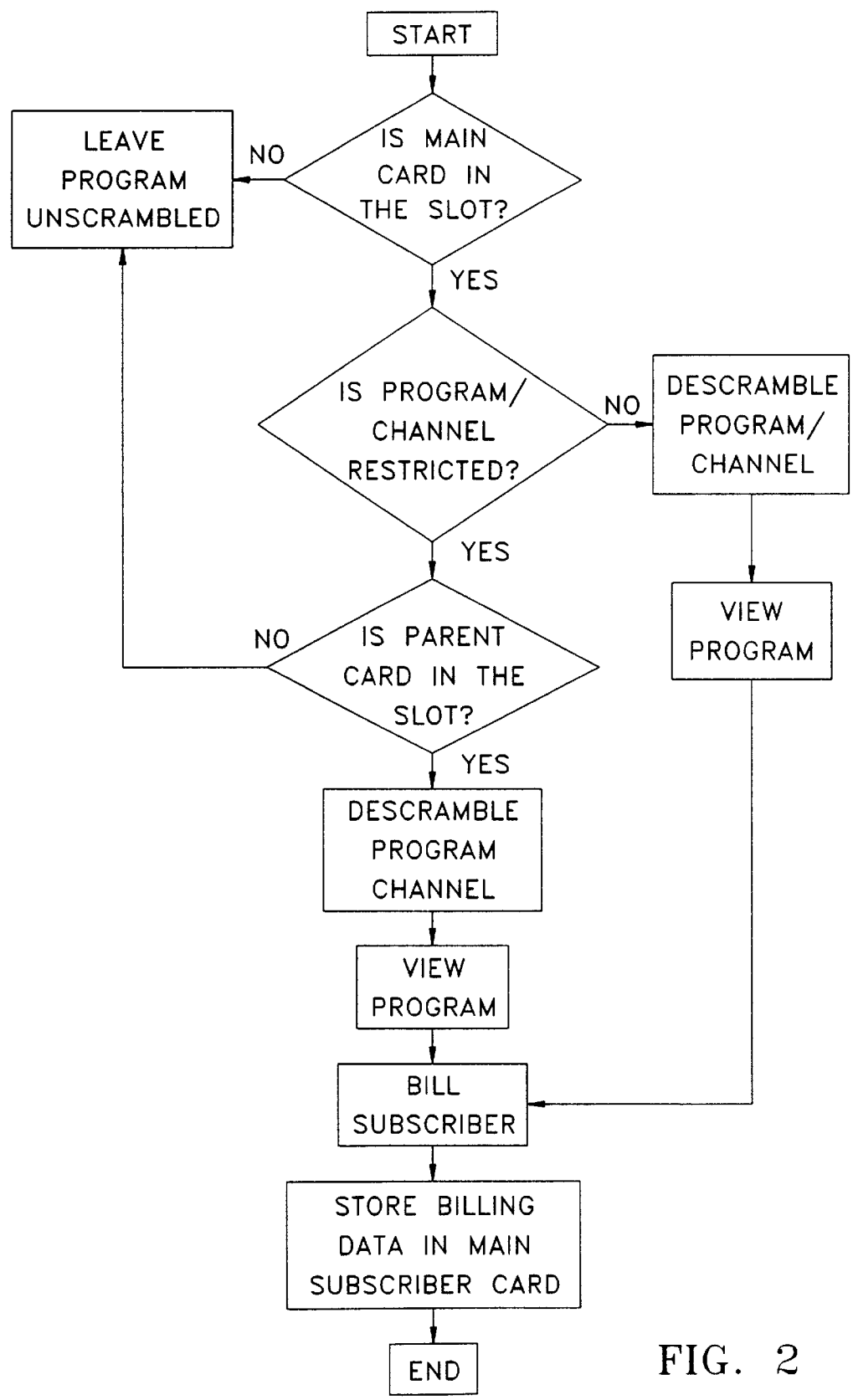
FIG. 2 is a flow chart illustration of the functionality of the parental control system of FIG. 1 in accordance with a preferred embodiment of the present invention.

Reference is now made to FIG. 2 which is a flow chart diagram of the operation of the parental control system of FIG. 1 in accordance with a preferred embodiment of the present invention.

When the main card is inserted in the card receptacle 24 of FIG. 1 and the parent card is not present in card receptacle 26 of FIG. 1, only programs which are not restricted for viewing under parental control are decrypted so that they can be intelligibly viewed on television 12.

If both the main card and the parent card are inserted in card receptacles 24 and 26 respectively, both programs which are restricted for viewing under parental control and programs which are not restricted for viewing under parental control are intelligibly displayed on television 12. Thus the parent card enables decryption of restricted programs in the presence of the main card. If the main card is removed from card receptacle 24 none of the transmitted programs is decrypted. However, if the parent card is removed from card receptacle 26 only programs which are restricted for viewing under parental control are not decrypted.

In a preferred embodiment of the invention billing data is also kept in the main card. In that case the main card retains billing data of programs which are not restricted for viewing under parental control as well as billing data of programs which are restricted for viewing under parental control. Additionally, separate accounts may be held for restricted programs and for non-restricted programs. Preferably, the separate accounts may be accessed by separate accounting identification codes.

In another preferred embodiment of the invention the parent card may retain initialization data and algorithms for initialization of an authentication procedure which is performed when the main card is changed. Most smart card based CATV systems require replacement of the smart cards, either periodically or upon suspicion that the CATV system has been compromised. In that case, new smart cards are sent to the subscribers, generally by mail. However, since mailed smart cards are subject to possible theft, it is preferred that the mailed smart cards do not contain any entitlements or valuable data which may be stolen or compromised.

Preferably, the main card at a subscriber location may be frequently replaced while the parent card is seldom replaced. In that case all entitlements and billing data remaining in the main card since last report to a billing facility may be transmitted to the parent card prior to replacement of the main card. When the subscriber receives a new main card and places it in card receptacle 24, the parent card automatically starts an initialization algorithm which employs two way communication between the parent card and the new main card to provide authentication, verification, validation or a combination thereof of the main card. If the new main card is found to be valid the parent card transfers all entitlements for non-restricted programs and billing data, remaining in the old main card since last report to a billing facility, to the new main card. Thus, stealing of the new main card prior to performing the initialization algorithm provides no benefit to a thief.

It is to be appreciated that card receptacles 24 and 26 may be interchangeable so that each of the smart cards, i.e. the main card and the parent card, may be inserted in any of the card receptacles 24 and 26. In such a case a smart card reader/writer, incorporated within CATV decoder 10 of FIG. 1, determines which of the main card and the parent card are inserted in any of the card receptacles 24 and 26. CATV decoder 10 is then operative to decrypt non-restricted programs when the main smart card is inserted in any of the card receptacles 24 and 26, and restricted programs when both the main card and the parent card are inserted in both card receptacles 24 and 26.

Figure 3:
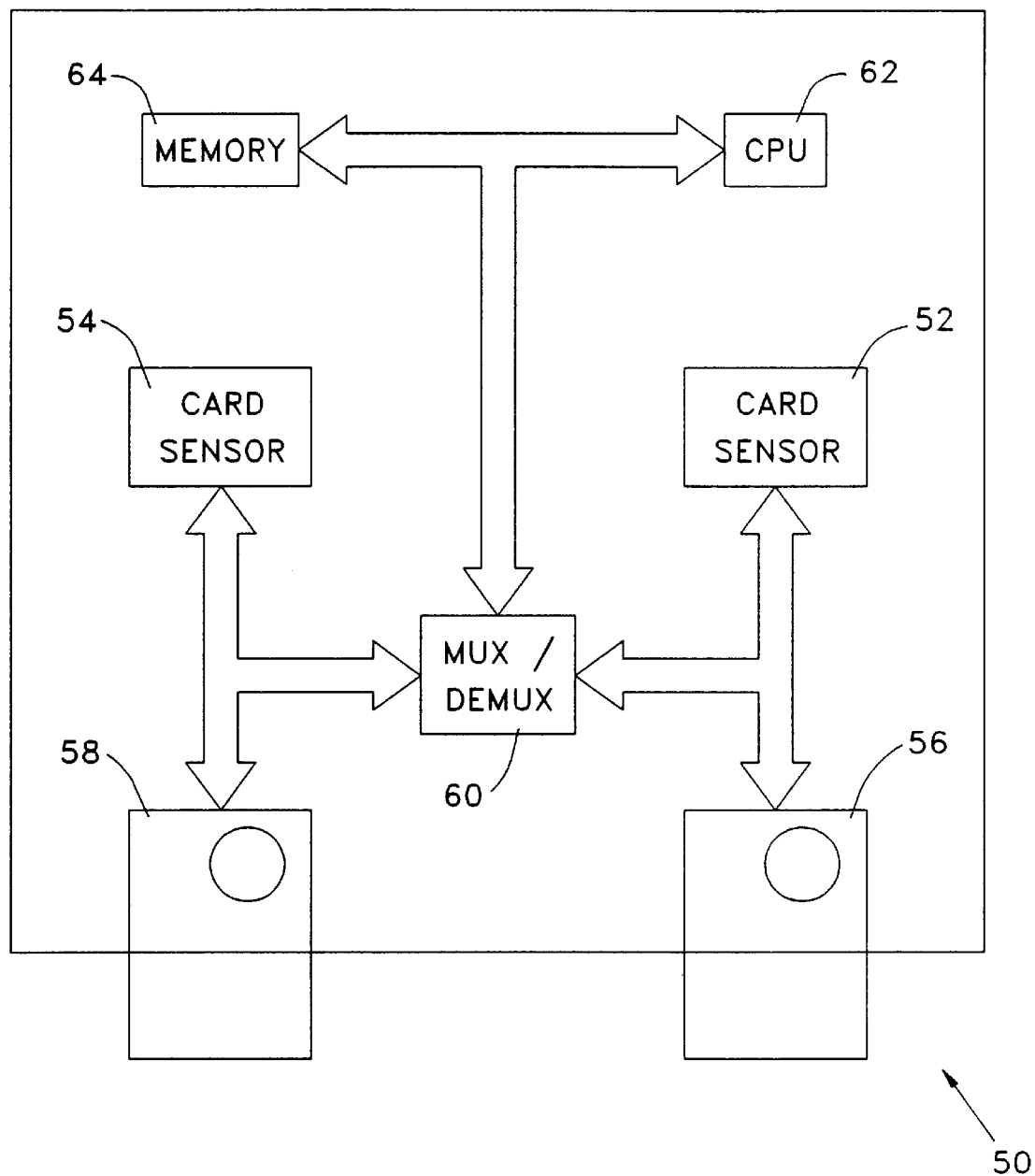
FIG. 3 is an illustration of a card reader/writer unit constructed and operative in accordance with a preferred embodiment of the present invention.

Reference is now made to FIG. 3 which is an illustration of a card reader/writer unit constructed and operative in accordance with a preferred embodiment of the present invention.

The card reader/writer unit of FIG. 3, generally denoted by reference numeral 50, may be embodied in various access systems, such as a CATV system. In that case, card reader/ writer unit 50 may be part of a CATV decoder, such as CATV decoder 10 (FIG. 1).

Card read/writer 50 includes two card sensors 52 and 54, a multiplexer/demultiplexer (MUX/DEMUX) 60, a CPU 62 and a memory 64. Card sensors 52 and 54 detect the existence of smart cards 56 and 58 in the respective card receptacles. Card sensors 52 and 54 also read data stored in the smart cards 56 and 58 and provide it to MUX/DEMUX 60. MUX/DEMUX 60 provides multiplexed data received from both smart cards 56 and 58 to a CPU 62 and a memory 64.

In a write sequence, CPU 62 and memory 64 provide data to be written on at least one of the smart cards 56 and 58 to MUX/DEMUX 60 which is operable to demultiplex the data and provide it to the respective card via the respective card sensors 52 and 54.

Figure 4:
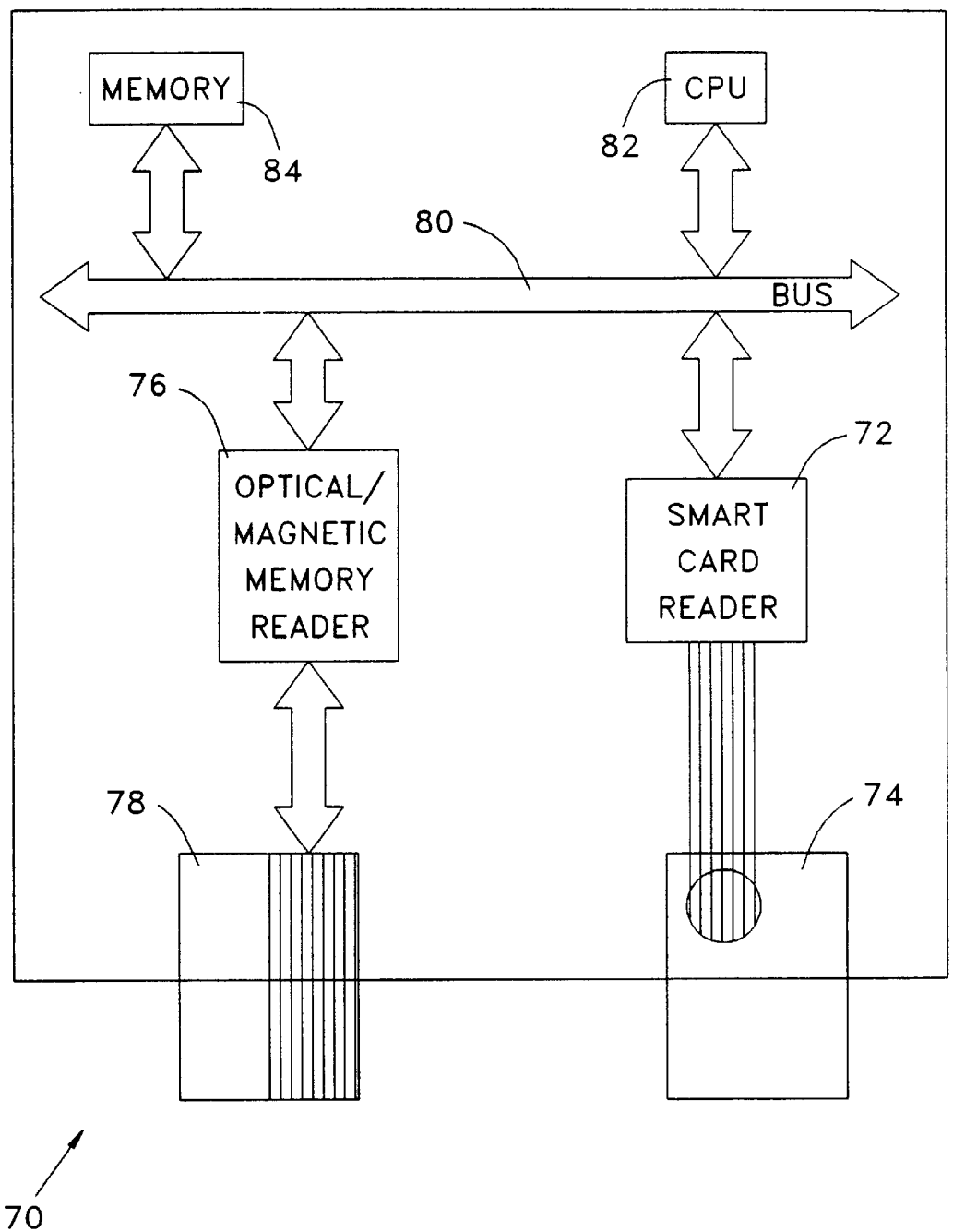
FIG. 4 is an illustration of a combined memory card and smart card reader/writer unit constructed and operative in accordance with a preferred embodiment of the present invention.

Reference is now made to FIG. 4 which is an illustration of a combined memory card and smart card reader/writer unit constructed and operative in accordance with a preferred embodiment of the present invention.

Combined memory card and smart card reader/writer unit, generally denoted by reference numeral 70, includes a smart card reader/writer 72 which is capable of reading/writing a smart card 74 and a memory card reader/writer 76 which is capable of reading/writing a memory card 78. It is to be appreciated that memory card 78 may be an optical memory card, a magnetic memory card or a magnetic disk.

Combined memory card and smart card reader/writer unit 70 also includes a communication BUS 80, a CPU 82 and a memory 84. Smart card reader/writer 72 and memory card reader/writer 76 are operable to provide two-way communication with CPU 82 and memory 84 and with smart card 74 and memory card 78 via the communication BUS 80.

Figure 5:
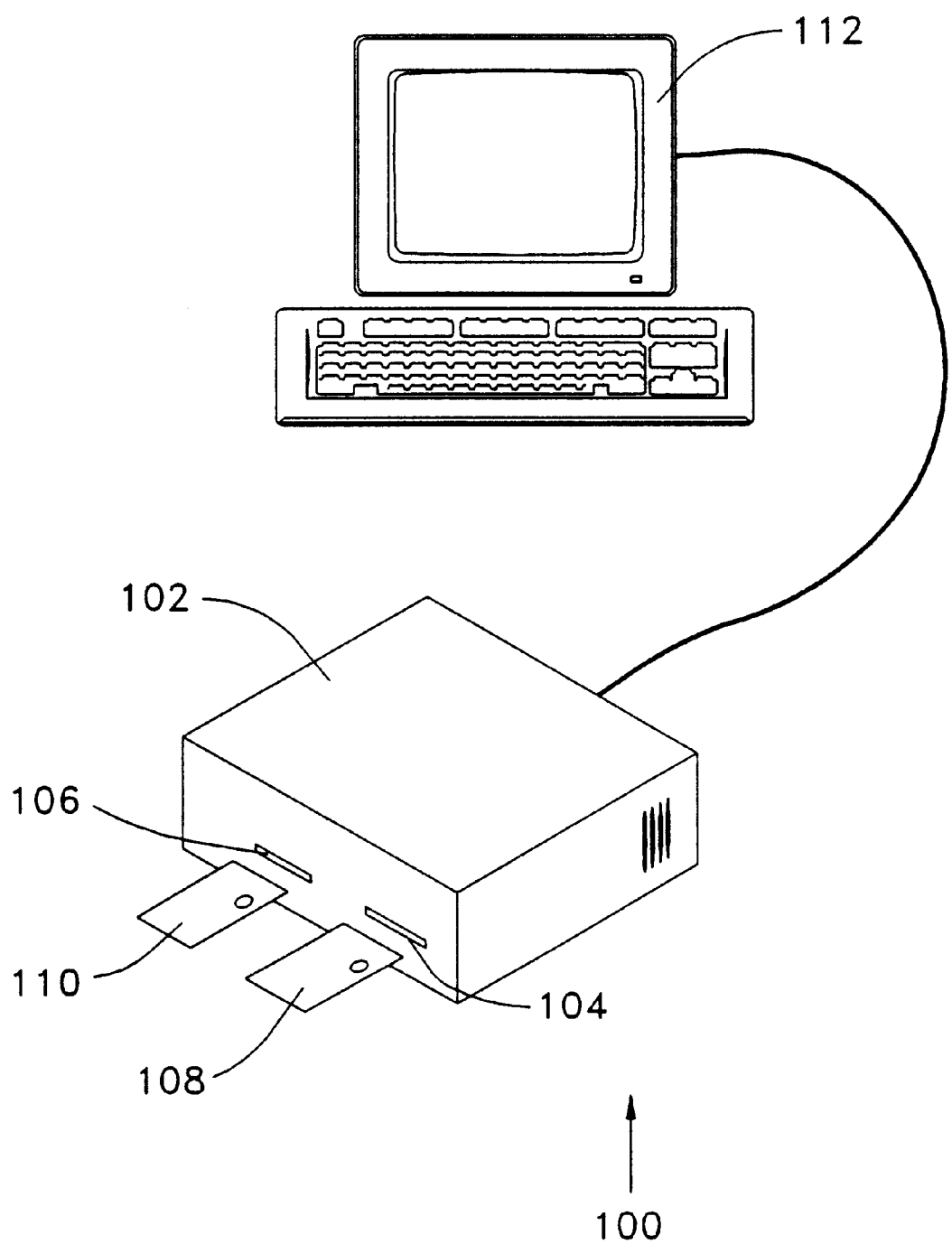
FIG. 5 is an illustration of an access system constructed and operative in accordance with a preferred embodiment of the invention.

Reference is now made to FIG. 5 which is an illustration of an access system constructed and operative in accordance with a preferred embodiment of the invention.

The access system of FIG. 5, generally denoted by reference numeral 100, may be employed to provide access to restricted areas such as buildings, stadiums and departments. It is especially suitable for use with racetrack facilities where access to horses, stables and riders' rooms are restricted to employees and key personnel only. Such applications require the features of personnel licensing and identification to be provided by the access system.

In accordance with a preferred embodiment of the invention the access system 100 includes an identifier station 102 with two card receptacles 104 and 106 incorporated within. Card receptacles 104 and 106 may accept a identification element 108 and an application element 110 respectively. License card 108 preferably includes personal and official information, as well as a digitized photograph to identify a card bearer, whereas application element 110 is the key to writing and reading all information stored in identification elements of the type of identification element 108. It is to be appreciated that when application element 110 is not present in card receptacle 106 fresh data cannot be stored in identification element 108 and existing information is inaccessible.

Part of the information in identification element 108 is clear and part is encrypted. The clear information may include the name and picture of the card bearer whereas the encrypted information may include the sites to which the card bearer is entitled to enter, racetrack commission name, restrictions relevant to racing and history events. The clear information may be read by any suitable smart card reader and the output is intelligible. The encrypted information may also be read by any smart card reader but the output is not intelligibly reproduced, unless read by identifier station 102 with both application element 110 and identification element 108 present in the corresponding card receptacles.

In accordance with a preferred embodiment of the invention various security levels may be employed in the system. Preferably, a selected security level is part of the input entered in one of application element 110 and identification element 108 or in both application element 110 and identification element 108. The security level may be a number between 0 and 3, where 0 denotes no encryption and 3 denotes the highest level of encryption. Thus, identification element 108 may include security level 0 and application element 110 may include a security level between 1 to 3. Alternatively, both application element 110 and identification element 108 may be encrypted.

Preferably, access system 100 reads the information stored in application element 110 and identification element 108 and provides at least part of it to a computer 112 which displays the information on a display, which may be the computer display. Alternatively, the information may be displayed on an internal display which is incorporated within access system 100. Preferably, the computer display and the internal display are suitable to display with high quality, the picture of the card bearer which is stored in the identification element 108.

Figure 6:
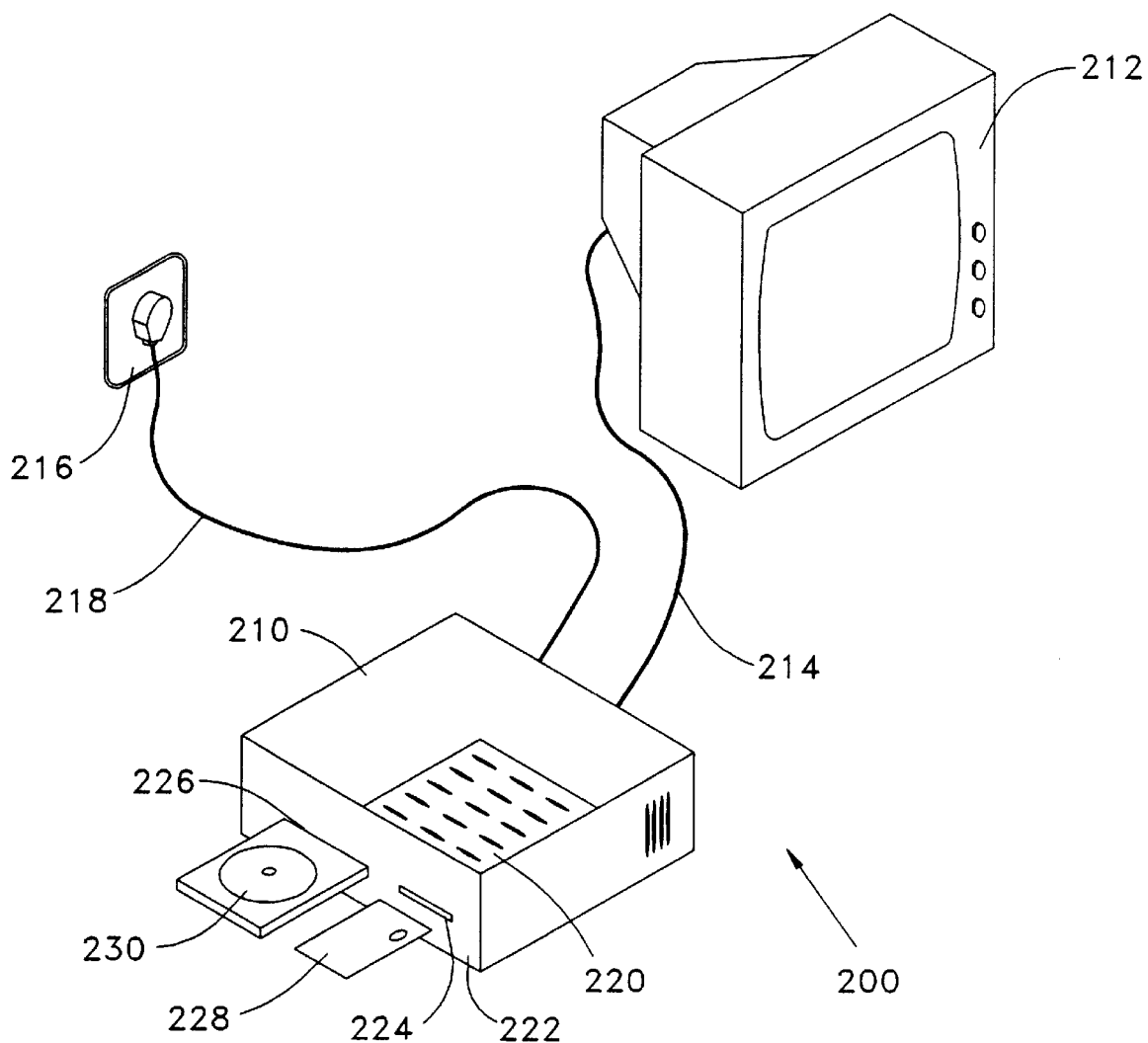
FIG. 6 is an illustration of a data access system constructed and operative in accordance with a preferred embodiment of the invention.

Reference is now made to FIG. 6 which is an illustration of a data access system constructed and operative in accordance with a preferred embodiment of the invention.

The access system of FIG. 6, generally denoted by reference numeral 200, may be employed to provide access to restricted information such as computer generated information, video games, CD-ROM data and data stored on magnetic disks. In a preferred embodiment of the invention the access system is operable with a CATV system.

In accordance with a preferred embodiment of the invention a CATV decoder 210 at a subscriber location is coupled to a television 212 via a coaxial cable 214. CATV decoder 210 is preferably fed from a CATV network (not shown) via a cable outlet 216 and a coaxial cable 218. CATV decoder 210 is preferably operated by a remote control (not shown) or a built-in keypad 220.

CATV decoder 210 includes, at a front panel 222, a card receptacle 224 and a CD-ROM unit having a receptacle 226. CATV decoder 210, incorporating the CD-ROM unit, is hereinafter described with reference to FIG. 7. Preferably, card receptacle 224 may accept a smart card 228. Alternatively, a magnetic card may be employed. In accordance with a preferred embodiment of the invention CATV decoder 210 is operative to decrypt CATV programs which are transmitted from a remote location, and games and data from a compact disk 230. The compact disk may preferably include games and data which are used in combination with data received from CATV transmissions.

It is to be appreciated that the CD-ROM unit may be replaced by an optical card unit, employing optical cards of the size of a credit-card, or a magnetic disk drive employing magnetic disks.

Figure 7:
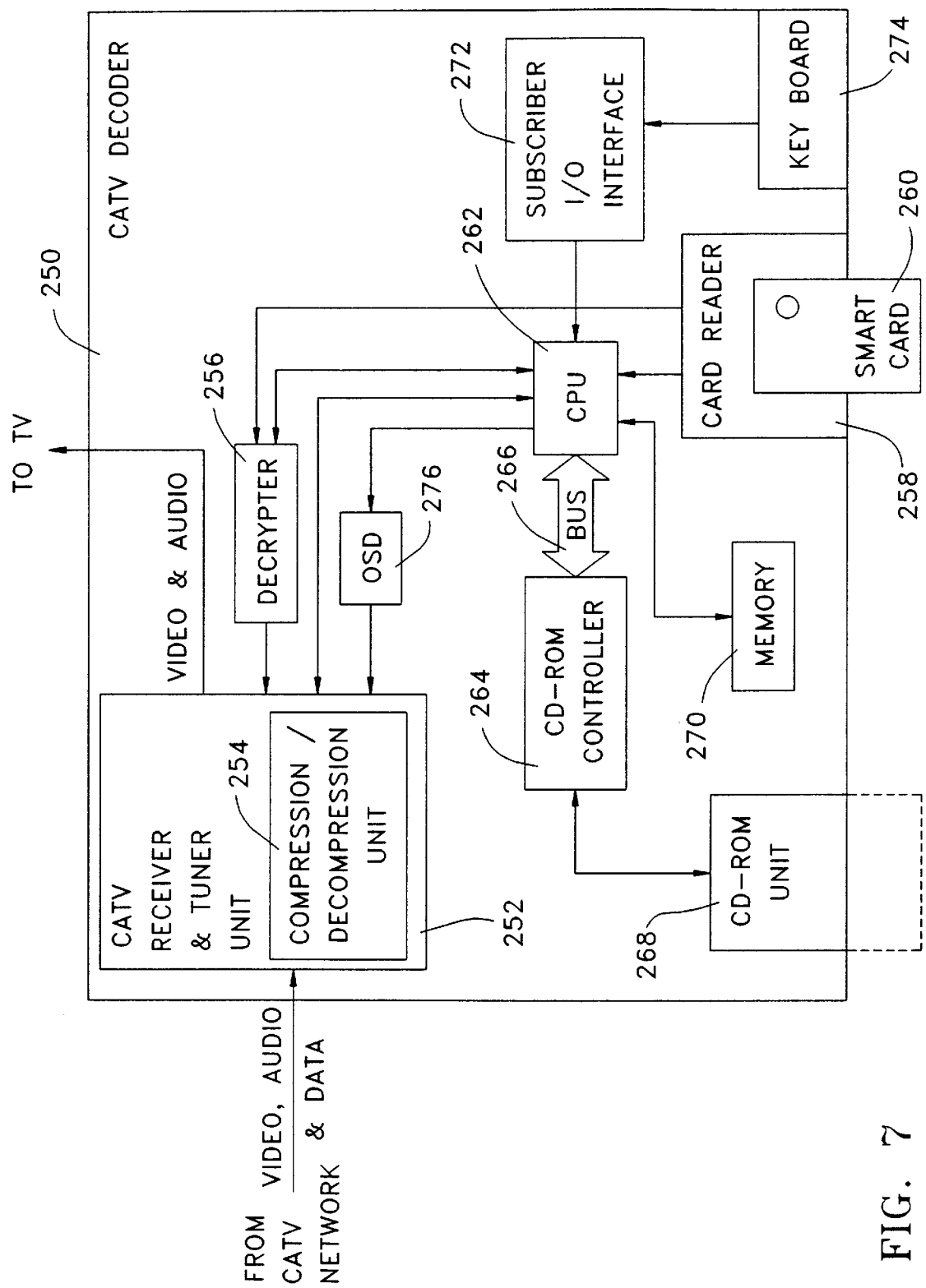
FIG. 7 is an illustration of part of the system of FIG. 6 constructed and operative in accordance with a preferred embodiment of the invention.

Reference is now made to FIG. 7 which is an illustration of a CATV decoder forming part of the system of FIG. 6, constructed and operative in accordance with a preferred embodiment of the invention.

Video, audio and data signals are provided by a CATV network (not shown) to a CATV receiver and tuner unit 252 in a CATV decoder 250. Preferably, CATV receiver and tuner unit 252 includes all circuitry required to provide video and audio signals in a format suitable for display on a television set. CATV receiver and tuner unit 252 may also include a compression/decompression unit 254 to decompress incoming compressed signals.

In a preferred embodiment of the invention a decrypter 256 is operable to decrypt encrypted transmissions prior to providing the video, audio and data signals to the television. Decrypter 256 is operative to receive any of seeds, keys and decryption algorithms from a smart card 260 via a smart card reader 258. Alternatively, decrypter 256 may receive seeds, keys and decryption algorithms via a CPU 262. CPU 262 is coupled to a CD-ROM controller 264 via a communication bus 266. CD-ROM controller 264 is coupled to a CD-ROM unit 268 and is operative to control the operation of CD-ROM unit 268 in accordance with instructions received from CPU 262.

Preferably, smart card 260 also provides any of seeds, keys and decryption algorithms for enabling access to data in a compact disk (not shown) mounted in CD-ROM unit 268. In that case CPU 262 receives any of the seeds, keys and decryption algorithms from smart card 260 via smart card reader 258, and applies decryption algorithms to data received from CD-ROM unit 268 via CD-ROM controller 264. CPU 262 is also coupled to a memory to store and retrieve data in accordance with instructions received from a subscriber, via a subscriber input/output interface 272. Subscriber input/output interface 272 is operable by the subscriber via keyboard 274 or a remote control (not shown). In a preferred embodiment of the invention CPU 262 may employ algorithms received from decrypter 256 and seeds or keys stored in memory 270 to decrypt the information received from the compact disk.

In the absence of smart card 260, or if an invalid card is present, the information received from the CATV network and the information received from the compact disk are not decrypted. Alternatively, separate entitlements may be provided to the subscriber, and CATV transmissions and compact disk data may be separately decrypted. It is to be appreciated that several levels of encryption may be employed so that the CATV transmissions have a higher level of security than the compact disk data, or vice versa.

In a preferred embodiment of the invention the data on the compact disk is not encrypted, but access is denied unless a key is applied to access files on the compact disk. Alternatively, access to the data on the compact disk may be denied or permitted by CPU 262 by controlling the operation of CD-ROM controller 264.

CPU 262 is also operative to provide information to be displayed on the television via an on-screen-display (OSD) 276. OSD 276 prepares the data received from CPU 262 in a format suitable for display on a television set and provides the data to a television via CATV receiver and tuner unit 252.

It is to be appreciated that the systems of FIGS. 6 and 7 may be operable in a stand-alone compact disk access system which is neither part of a CATV system nor coupled to a CATV system. Such a system may be a computer system in which access to a compact disk carrying data is required. In such a case the systems of FIGS. 6 and 7 may be degraded to a system in which smart card 260 enables access to data on a compact disk only via CPU 262, which may be part of the above mentioned computer system. To achieve this, the CATV receiver and tuner unit 252 in FIG. 7 may be omitted, the television 212 may be replaced by a simple computer monitor, the compression/decompression unit 254 may be omitted, if compression/decompression of data is not required, and the connection to cable outlet 216 may be omitted.

If, however, compression/decompression of data is required the compression/decompression unit 254 may remain as an independent unit which is not part of CATV receiver and tuner unit 252. In that case compression/decompression unit 254 may be either part of the computer system or a separate unit thereof, and all data from encryptor 256, CPU 262 and OSD 276 may be received directly at compression/decompression unit 254. Compression/decompression 254 will output data, including video data from a compact disk, to the computer monitor.

The case of stand-alone compact disk access system may be also captured as a special configuration of the systems of FIGS. 6 and 7 in which CATV transmissions are not present.

Figure 8:
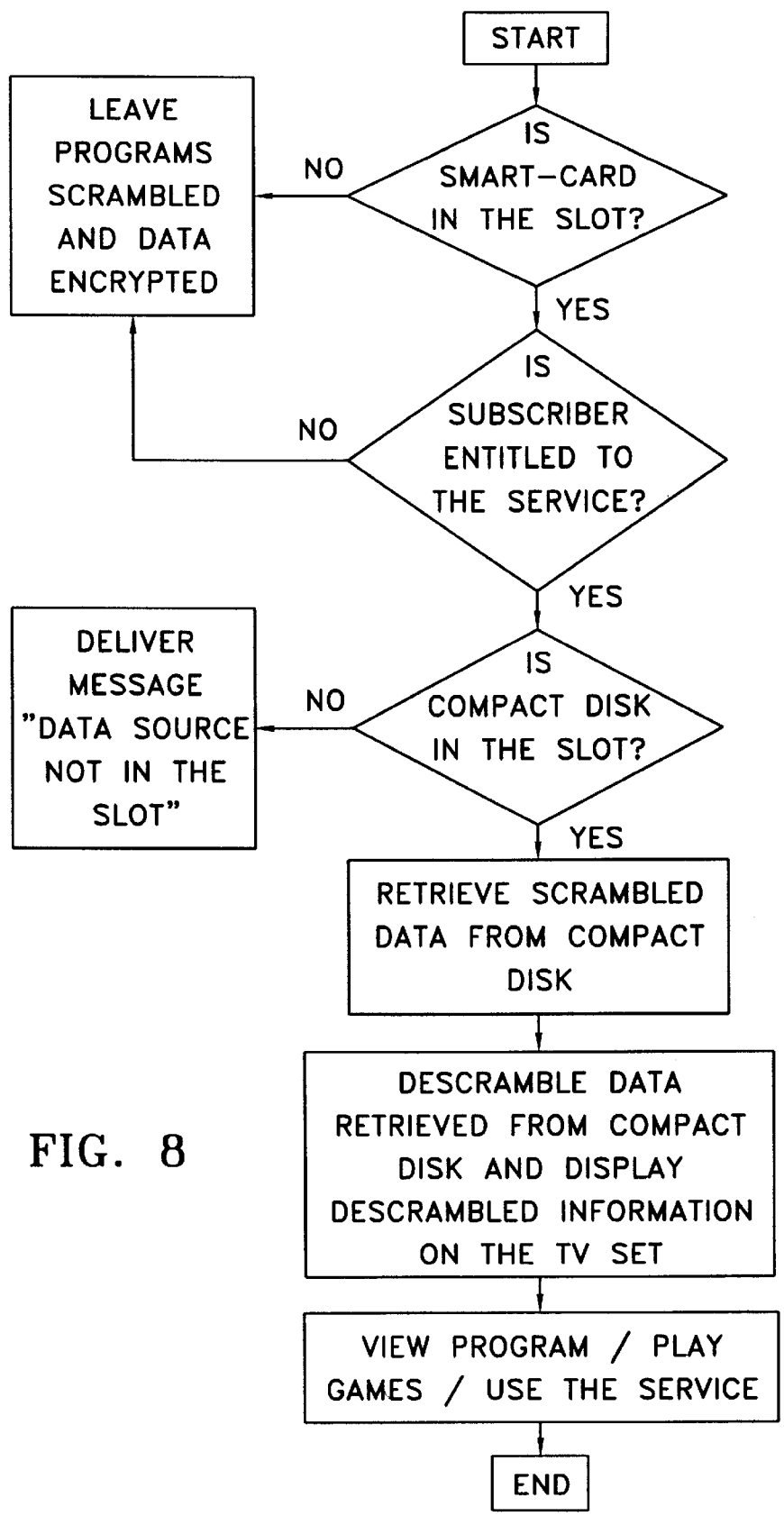
FIG. 8 is a flow chart illustration of the functionality of the apparatus of FIGS. 6 and 7 in accordance with a preferred embodiment of the invention.

Reference is now made to FIG. 8 which is a flow chart illustration of the functionality of the apparatus of FIGS. 6 and 7 in accordance with a preferred embodiment of the invention.

The CATV decoder of FIG. 7 may receive smart cards and any of CD-ROM, optical card and magnetic disk. A subscriber may enter selections via a remote control. If the subscriber does not insert his smart card into the card receptacle, programs and data transmitted via a CATV network remain scrambled. If the smart card is inserted in the card receptacle, the system checks if the subscriber is entitled to the selected service.

If the subscriber is not entitled to the selected service, transmissions and data regarding the selected service remain scrambled. If the subscriber is entitled to the selected service the system checks if the compact disk or the other data source is in the respective receptacle. If the data source is not in inserted in the receptacle, the system delivers a message "data source not in the slot". If the compact disk or data source is inserted in the card receptacle, the data is retrieved and decrypted and transmissions are descrambled so that the subscriber may make use of it.

Figure 9:
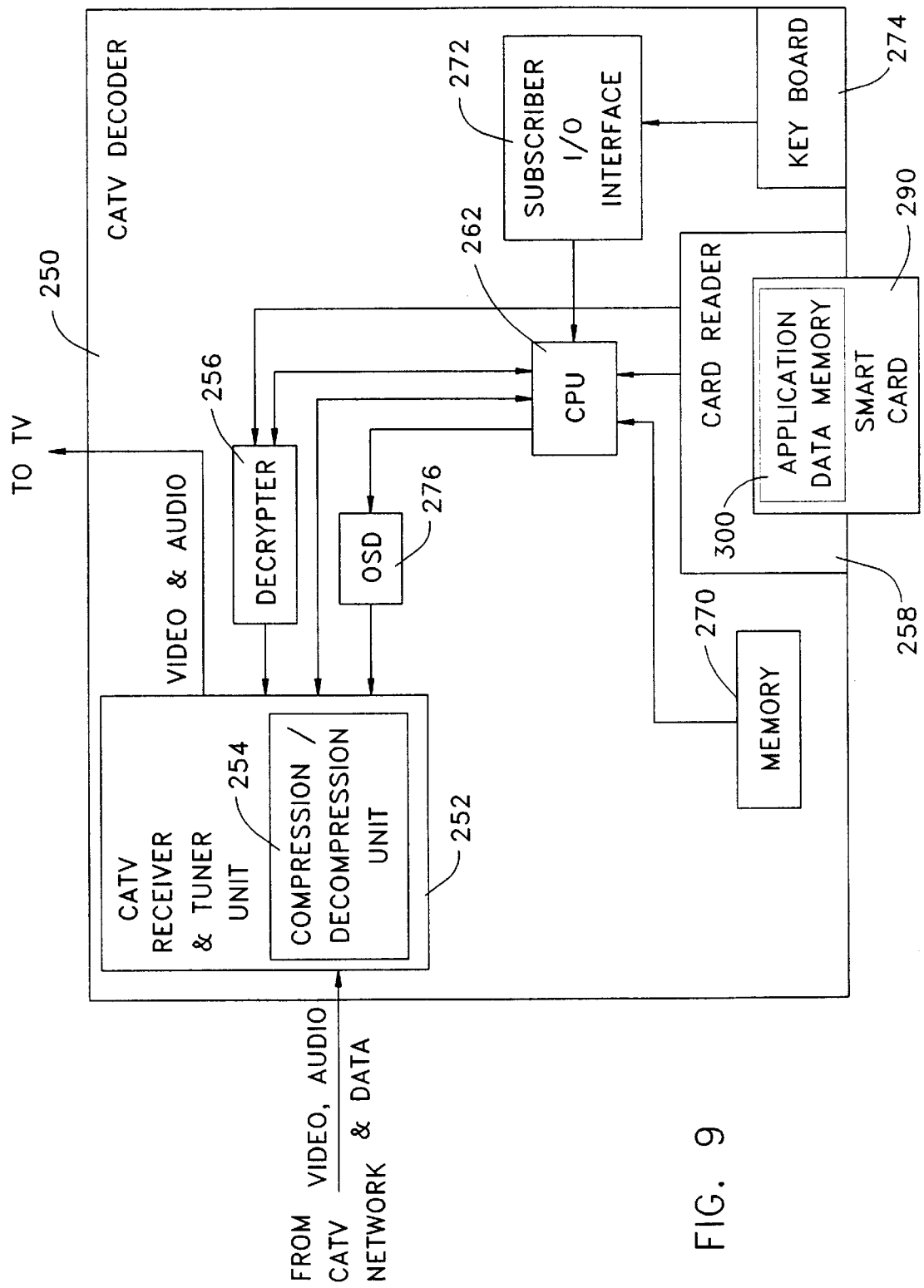
FIG. 9 is an illustration of an alternative embodiment of the system of FIG. 7.

Reference is now made to FIG. 9, which is an illustration of an alternative embodiment of FIG. 7. It is appreciated that the systems of FIGS. 6 and 7 and the method described in FIG. 8 may be realized with one card only, as shown in FIG. 9. In this case the data source may be part of a smart card, so that a smart card 290 includes a memory 300 which is large enough to store application data which may be used either with CATV transmissions or as stand-alone.

Such application data may include the storage of video data, such as video clips or significant events in sports or politics. Alternatively, pictures, voice data, important computer data and music clips may be stored in the smart card. In a preferred embodiment of the invention application data may be stored in a read-only memory (ROM) in the smart card. Alternatively, application data may be stored in a random-access memory (RAM) in the smart card. In that case the application data may be updated, periodically or upon request, via the CATV network.

Reference is now made to FIG. 10, which is an illustration of a smart card comprising two integrated circuits, the smart card being constructed and operative in accordance with an alternative preferred embodiment of the present invention. In the embodiment of FIG. 10, a smart card 310 may comprise two integrated circuits 320 and 330. In such a case all the above mentioned access control functions performed with two cards, i.e. parental control, billing and access to areas, are now performed with one card 310 only which incorporates two integrated circuits 320 and 330. For the cases in which access to data is required one integrated circuit, such as the integrated circuit 320, is employed for access control and security and the second integrated circuit, such as the integrated circuit 330, is mainly employed for data storage. Data from the second integrated circuit is pulled upon authorization from the first integrated circuit. The advantage of such a configuration is that all communications between the two integrated circuits are performed inside the smart card so that hacking becomes more difficult.

Reference is now made to FIG. 11, which is a simplified flowchart illustration of a preferred method of utilizing a smart card such as the smart card 290 of FIG. 9. The method of FIG. 11 is self-explanatory.

Reference is now made to FIG. 12, which is a simplified partly pictorial, partly block diagram illustration of a document conditional access (CA) system, constructed and operative in accordance with another preferred embodiment of the present invention. The system of FIG. 12 preferably comprises a CA document loading unit 350, which typically comprises conventional communication apparatus (not shown) for communicating with a document source 355. The document source 355 may comprise any appropriate document source, such as a broadcasting headend having a plurality of documents for broadcast.

The term "document", as used throughout the present specification and claims, is intended to include generally any collection of information distributable and storable in electronic form, in particular an electronic representation of any one or combination of the following: a text document; a text document with illustrations; an electronic representation of an article, a periodical, or a book; a video clip; an audio clip; an animated scene; an electronic representation of a map, including an electronic representation of a map comprising directions for finding at least one location; a game, such as an electronic game; hypertext information; and a multimedia document including one or all of the above. In some cases, the term "information" may be used alone synonymously with "document". Methods of storing documents in electronic form in memory, such as in computer memory, are well-known in the art.

A communication channel 360 between the CA document loading unit 350 and the document source 355 may be established using any means well known in the art, such as any one or combination of the following: wired communication; wireless communication; a cable television system; an analog or digital terrestrial television system; a satellite system including a satellite television system and/or a satellite multimedia distribution system. The communication channel 360 is shown in FIG. 12 as a bi-directional channel. It is well-known in the art of pay television systems to use a bi-directional channel, typically including a low bandwidth channel, such as a telephone channel, from the user to the broadcasting source, in order to allow information such as billing information to be reported back to the broadcasting source; it is also known to use a high bandwidth channel from the user to the broadcasting source.

It is appreciated that, in the present invention, any of a low bandwidth channel, a high bandwidth channel, or no channel at all may be used in the direction from the CA document loading unit 350 to the document source 355. Either a low bandwidth channel, for reasons of economy, or a high bandwidth channel, for reasons of high data transfer rates, would be preferred.

The CA document loading unit 350 also preferably comprises a document transmission module 365 and an authorization module 370 which are in operative communication with each other. The document transmission module 365 preferably comprises a card reader/writer 375, which may comprise any appropriate card reader/writer, such as a smart card reader/writer, as is known in the art. The authorization module 370 preferably comprises a card reader 380, which may comprise any appropriate card reader, such as a smart card reader, as is known in the art. It is appreciated that in some applications of the system of FIG. 12, as described below, it may be preferable to use a card reader/writer similar to the card reader/writer 375 in place of the card reader 380.

The document transmission module 365 and the authorization module 370 are typically implemented in a combination of hardware and software, as is well known in the art.

As explained above, the term "smart card" is used herein interchangeably with the term "IC card", and is meant to include any device of whatever external form, whether the form of a card or another form such as a key, having internal structure and characteristics similar to those of an IC card. It is appreciated that both the card reader/writer 375 and the card reader 380 are preferably adapted to receive a smart card, in one or more external forms, in removable operative association therewith, as is well known in the art.

The operation of the apparatus of FIG. 12 is now briefly described. An information storage smart card 385 is preferably placed in removable operative association with the card reader/writer 375 and is thus enabled to communicate therethrough with the document transmission module 365. The information storage smart card 385 preferably comprises a processor 390 and a memory 395.

Optionally, as is well-known in the art of pay television, the information storage smart card 385 may be paired with the CA document loading unit 350, such that the information storage smart card 385 may not be operative with another CA document loading unit, or such that another information storage smart card may not be operative with the CA document loading unit 350, or both. Methods of achieving such pairing are well-known in the art. Furthermore particular characteristics, other than pairing-related characteristics, of the information storage smart card 385 and the CA document loading unit 350 might be checked; for example, a particular parental control rating might be required of the CA document loading unit 350 in order to operate with the information storage smart card 385.

The processor 390 may be similar to smart card processors described above or to other smart card processors which are well known in the art. The memory 395 may be similar to the memory 300 of FIG. 9 or to other smart card memories which are well known in the art. Preferably, a non-volatile memory of adequate capacity to hold one or more documents may be used, typically a memory with at least several megabytes capacity. It is appreciated that a larger memory may be preferred, but commercial factors such as price of a larger memory should be taken into account.

An authorization smart card 400, comprising a processor 402 which may be similar to the processor 390, is preferably placed in removable operative association with the card reader 380 and is thus is enabled to communicate therethrough with the authorization module 370.

Typically, the authorization smart card 400 is accepted by the authorization module 370 only after authentication of the authorization smart card 400, as is well known in the art. It is known in the art to use zero-knowledge authentication methods, such as the Fiat-Sharnir method described in U.S. Pat. No. 4,748,668 to Shamir et al, the disclosure of which is hereby incorporated herein by reference. Such zero-knowledge methods, in particular Fiat-Shamir, are believed to be preferable for use in the present invention. It is appreciated that, as is well known in the art, zero-knowledge authentication may take place between: the authorization smart card 400 on one side; and either or both of the authorization module 370 and a central authorization office such as the document source 355, in communication with the apparatus of FIG. 12, on the other side.

It is further appreciated that, as is well known in the art, authentication of the authorization smart card 400 may comprise authentication to use only one or more of a plurality of available documents or available services associated with one or more documents. Without limiting the generality of the foregoing, it is further appreciated that such available services might include one or more of the following: viewing a document in a particular language; viewing a document in a particular format; viewing a particular portion of a document; or viewing a document at a particular price. Furthermore, the authorization smart card 400 may comprise connection information characterizing a document source 355 and/or a method of connecting therewith, enabling the CA document loading unit 350 to communicate with an appropriate document source 355. Such connection information may include routing or telephone number information as well as login information.

It is further appreciated that the authorization smart card 400 may comprise geographical information. Such geographical information is well-known in the art of pay television and is sometimes used to prevent certain events, such as sporting events, from being viewed from a particular location. In the present invention, such geographical information might be used to prevent download of documents whose availability is legally restricted or to encourage the downloading of other documents, such as maps, which may be particularly suited for a given geographical location.

A user of the system of FIG. 12 typically requests access to a document 405. The request is typically entered to the CA document loading unit 350 using conventional data entry means (not shown). Alternatively, the request may be comprised within the information storage smart card 385 or within the authorization smart card 400 or may be otherwise transmitted to the CA document loading unit 350.

Typically, a request is sent to the document source 355, via the communication channel 360, to obtain the requested document. The request may include authorization information comprised in the authorization module 370. The authorization information may include information indicating that the user has purchased or otherwise legitimately obtained access to the document 405. The authorization information may also include parental control information, as described above, indicating the level or levels of rating which the user is allowed to access.

Alternatively, authorization information may be provided from any other appropriate source such as, for example, via a publicly-available communications network such as the Internet, using methods well known in the art. Further alternatively, the request may not include authorization information. Still further alternatively, no request need be sent, but rather the CA document loading unit 350 may monitor incoming broadcasts over the communication channel 360, only processing broadcasts which contain a requested document such as the document 405.

In a case where the request does not include authorization information or in which no request is sent, it is appreciated that the functions of applying conditional access, that is, determining whether the user has legitimate access to the document 405 and applying other limits such as parental control limits to the user's access to the document 405, may take place entirely inside the CA document loading unit 350.

Typically, the authorization module 370 communicates with the authorization smart card 400 in order to determine whether access is authorized and, if access is authorized, supplies information, including decryption information, necessary to receive the document 405 to the document transmission module 365. Alternatively, the authorization smart card 400 may delegate or pass on authorization information to the authorization module 370 or an application residing therein, the authorization module 370 thereby being enabled to carry out authorization without further reference to the authorization smart card 400, it being appreciated that this case may be particularly applicable if the authorization module 370 and the authorization smart card 400 are produced by different manufactures with a limited degree of interoperability. The principles of conditional access applicable in this case are described in general terms above and are well known in the art of pay television.

The document transmission module 365 preferably conditionally transmits the document 405 to the information storage smart card 385, only if access is authorized, as described above. The document 405 may be transmitted in encrypted or partially encrypted form, and may be transmitted along with further authorization information, such as a decryption key or a list of one or more restrictions placed upon access to the document 405. The one or more restrictions may include any appropriate restriction such as a restriction only allowing a portion of the document 405 to be viewed or only allowing the document 405 to be viewed in a certain format, such restrictions being based typically on parental control limits or other limits to the user's access to the document 405.

The document 405 is typically stored, under control of the processor 390, in the memory 395, along with any accompanying access information, restrictions, and/or formatting information. Additionally or alternatively, the document 405 may, under control of the processor 390, be used by the processor 390 to update previously stored information (not shown) stored in the memory 395. Updating a stored electronic document based on an electronic update is well-known in the art of computers. Said updating may include, for example, one or more of the following: replacing the previously stored information; changing the previously stored information; deleting the previously stored information; and updating the previously stored information.

Optionally, the system of FIG. 12 also comprises a document access unit 410, typically comprising a document utilization module 415 in operative association with an authorization module 420. The document access unit 410 also typically comprises document presentation apparatus such as a display screen 425 and speakers 430. It is appreciated that, in FIG. 12, the display screen 425 and the speakers 430 are shown only as an example of document presentation apparatus and that any appropriate apparatus for making the document 405 palpable to the senses may be alternatively or additionally used.

Preferably, the document access unit 410 comprises a portable unit, similar in size and weight to electronic book apparatus which is well known in the art.

The document utilization module 415 typically comprises a card reader 380 which may be similar in structure and function to the card reader 380 comprised in the authorization module 370.

The operation of the document access unit 410 of FIG. 12 is now briefly described. The information smart card 385 is removed from operative association with the card reader/writer 375 comprised in the document transmission module 365 and placed in operative engagement with the card reader 380 comprised in the document utilization module 415.

The document utilization module 415, typically under command of a user of the document access unit 410, is typically operative to read and decrypt a document stored in the information smart card 385. The reading and decrypting of the document preferably takes place under conditional access control, as described above, in which the authorization module 420 applies any applicable conditional access control, typically based upon parameters stored in the information smart card 385, as described above. It is appreciated that any appropriate authorization method known in the art, including but not limited to use of a second smart card (not shown) as described above, may additionally or alternatively be employed.

The document utilization module 415 is also typically operative to format the document as appropriate in order to place the document into a form suitable for display on the screen 425 and/or playback through the speakers 430. The formatting performed by the document utilization module 415 may comprise one or more of the following: standard formatting applied to all documents; standard formatting applied to all documents of a specific type; formatting based on information stored in the document; and formatting based on conditional access information stored in the information smart card 385.

One example, not intended to be limiting, of conditional access information stored in the information smart card 385 comprises parental control information, controlling which portions or which version of all or a portion of the document may be displayed. In such a case, the document 405 is typically received in several versions, each version preferably being encrypted in accordance with at least one parameter, such as an encryption key, which differs among the different versions. In another example, conditional access information might include language control information, controlling what language version or versions are available or preferred for display.

It is appreciated that although the document loading unit 350 and the document access unit 410 are shown in FIG. 12 and described above as comprised in a single system, each of the document loading unit 350 and the document access unit 410 may alternatively be considered as a separate system and may operate substantially independent of each other. For example, the CA document loading unit 350 may load a document into the information storage smart card 385 and the information smart card 385 may subsequently be utilized with any appropriate apparatus other than the document access unit 410. Some examples of other apparatus include one or more of the following: a document display device of a type other than the document access unit 410; an appropriately equipped personal computer; an appropriately equipped personal communications device; an appropriately equipped personal display device, such as an appropriately equipped electronic book; an appropriately equipped television; an appropriately equipped radio; an appropriately equipped sound system; and an appropriately equipped automobile guidance system, in which case the document would preferably comprise an electronic map in appropriate format.

Similarly, the information smart card 385 used with the document access unit 410 may have been loaded by any appropriate apparatus other than the CA document loading unit 350.

Reference is now made to FIG. 13, which is a simplified block diagram illustration of a preferred implementation of the document transmission module 365 of FIG. 12. Reference is now additionally made to FIG. 14, which is a simplified block diagram illustration of a preferred implementation of the document utilization module 415 of FIG. 12. The apparatus of FIGS. 13 and 14 is self-explanatory. It is appreciated that the implementations of FIGS. 13 and 14 are provided by way of example only, and that other implementations may be possible.

Figure 15:
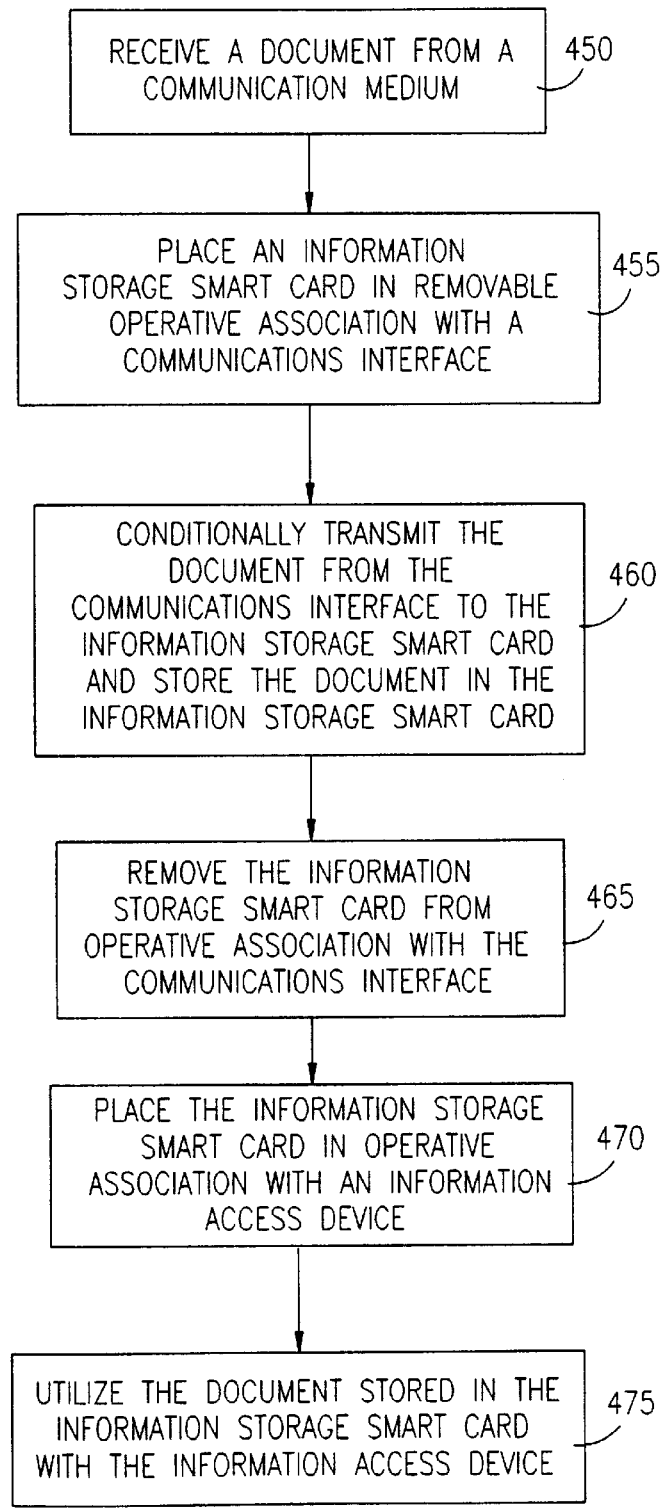
FIG. 15 is a simplified flowchart illustration of a preferred method of operation of the apparatus of FIG. 12.

Reference is now made to FIG. 15, which is a simplified flowchart illustration of a preferred method of operation of the apparatus of FIG. 12. The method of FIG. 15 preferably includes the following steps:

A document is received from a communications medium (step 450). Typically, as described above with reference to FIG. 12, the document may comprise or be transmitted along with conditional access information and/or formatting information.

An information storage smart card is placed in removable operative association with a communications interface (step 455), the communications interface typically being operatively associated with the communications medium, such that the communications interface may have access to the document.

The document is conditionally transmitted from the communications interface to the information storage smart card and stored in the information storage smart card (step 460). As described above with reference to FIG. 12, access to the document may be restricted to those who have paid for the document, and may additionally be restricted based on one or more specific restrictions. The one or more specific restrictions may include any appropriate restriction such as a restriction only allowing a portion of the document to be viewed or only allowing the document to be viewed in a certain format, such restrictions being based typically on parental control limits or other limits to the user's access to the document. Access to the document may also be restricted in accordance with a spending limit, in that the document may be available only if the price of the document does not cause a user to exceed a spending limit associated with the user.

Further, in step 460 a message, such as a confirmation message indicating reception of the document, a request for information, or a status message may be transmitted back to the source of the document via the communications medium. As is well-known in the art, the message may be appropriately encrypted and/or signed, typically with a digital signature as is well-known in the art.

The information storage smart card is removed from operative association with the communications interface (step 465) and placed in operative communication with an information access device (470). The stored document is then utilized in the information access device (step 475); as described above with reference to FIG. 12, conditional access may be applied as part of the utilizing of step 475.

It is appreciated that steps 450, 455, and 460 may comprise a preferred method of operation of the apparatus of FIG. 12 without steps 465, 470, and 475. Similarly, steps 465, 470, and 475 may comprise a preferred method of operation of the apparatus of FIG. 12 without steps 450, 455 and 460.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

What is claimed is:

1. A method for downloading a document via a communications medium operatively associated with a communications interface, the method comprising:

receiving the document from the communications medium;

placing an information storage smart card in removable operative association with the communications interface; and conditionally transmitting the document from the communications interface to the information storage smart card and storing the document in the information storage smart card, wherein the storing comprises updating previously stored formatting information stored in the information storage smart card, and the updating previously stored formatting information comprises at least one of the following: updating decryption information; and updating general formatting information.

2. A method according to claim 1 and wherein the conditionally transmitting step comprises comparing a price associated with the document to a spending limit and transmitting the document only if the price is in accordance with the spending limit.

3. A method according to claim 1 and wherein the document comprises at least one of the following: text; graphics; sound; an animated scene; multimedia information; hypertext information; navigation information; a map; a book; a periodical; and a game.

4. A method according to claim 1 and also comprising the step of sending a message from the information storage smart card to an information storage facility, wherein the message comprises at least one of the following: a request for information; and status information.

5. A method according to claim 4 and wherein the message comprises an encrypted message.

6. A method according to claim 5 and wherein the message comprises a signed message.

7. A method according to claim 1 and also comprising placing an authorization smart card in removable operative association with the communications interface, wherein the conditionally transmitting step comprises transmitting the document to the information storage smart card only if the authorization smart card is authorized to access the item of information.

8. A method according to claim 1 and wherein the information storage smart card is paired with the communications interface.

9. A method according to claim 1 and also comprising:

removing the information storage smart card from operative association with the communications interface;

placing the information storage smart card in operative association with an information access device; and utilizing the document stored in the information storage smart card with the information access device.

10. A method according to claim 9 and wherein the information access device comprises at least one of the following: a document display device; a personal computer; a personal communications device; a personal display device; a television; a radio; a sound system; and a guidance system.

11. A method according to claim 9 and wherein the utilizing step comprises conditionally utilizing the document.

12. A method according to claim 9 and wherein the utilizing step comprises formatting the document.

13. A method according to claim 12 and wherein the formatting step comprises formatting based on formatting information stored in the information storage smart card.

14. A method according to claim 13 and wherein the formatting information is comprised in the document.

15. A method according to claim 13 and wherein the formatting information comprises decryption information.

16. A method according to claim 12 and wherein the formatting step comprises formatting based on formatting information stored in the information access device.

17. A method according to claim 16 and also comprising updating the formatting information based on formatting update information stored in the information storage smart card.

18. A method according to claim 1 and wherein the conditionally transmitting step comprises transmitting the information to the information storage smart card only if the information storage smart card is authorized for use in the communications interface.

19. A method according to claim 1 and wherein the conditionally transmitting step comprises transmitting the document to the information storage smart card only if the information storage smart card is authorized to receive the document.

20. A method according to claim 1 and wherein the conditionally transmitting step comprises transmitting the document to the information storage smart card upon external authorization.

21. A method according to claim 1 and wherein said document is associated with a geographical region, and the conditionally transmitting step comprises transmitting the document to the information storage smart card if the information storage smart card is associated with the geographical region.

22. A method according to claim 1 and wherein said document is associated with a geographical region, and the conditionally transmitting step comprises preventing transmission of the document to the information storage smart card if the information storage smart card is associated with the geographical region.

23. A method according to claim 22 and wherein the document comprises authorization information comprising information indicating whether the information storage smart card is authorized to use the document.

24. A method according to claim 23 and wherein the conditionally transmitting step comprises transmitting the information to the information storage smart card only if the information storage smart card is authorized to use the document in accordance with the authorization information.

25. A method according to claim 1 and wherein the updating step comprises at least one of the following: replacing the previously stored information; changing the previously stored information; deleting the previously stored information; and supplementing the previously stored information.

26. A method according to claim 2 and also comprising placing an auxiliary card in removable operative association with the information access device.

27. A method according to claim 26 and wherein the auxiliary card comprises an authorization card, and the utilizing step comprises utilizing the document in the information storage smart card only if the authorization card is authorized to access the document.

28. A method according to claim 27 and wherein the document stored in the information storage smart card comprises a plurality of stored documents, and the utilizing step comprises utilizing at least one of the plurality of stored documents only if the authorization card is authorized to access the at least one of the plurality of stored documents.

29. A method according to claim 28 and wherein the authorization card comprises an authorization smart card.

30. A method according to claim 28 and wherein the plurality of stored documents comprises a plurality of versions of a single document.

31. A method according to claim 30 and wherein each one of the plurality of versions is encrypted according to at least one encryption parameter which differs for each one of the plurality of versions.

32. A method according to claim 26 and wherein the auxiliary card comprises an authorization card, and the utilizing step comprises utilizing the document stored in the information storage smart card only if the authorization card is authorized to access the document.

33. A method according to claim 1 and wherein the document comprises parental control information, and the conditionally transmitting comprises transmitting only in accordance with the parental control information.

34. A method according to claim 33 and wherein the parental control information is associated with only a portion of the document, and the conditionally transmitting step comprises transmitting the portion of the document only in accordance with the parental control information.

35. A method for downloading a document via a communications medium attached to a communications interface, the method comprising:

receiving the document from the communications medium;

placing an information storage smart card in removable operative association with the communications interface;

placing an auxiliary card in removable operative association with the communications interface;

transmitting the document from the communications interface to the information storage smart card and storing the information in the information storage smart card; and utilizing the document stored in the information storage smart card, wherein the storing comprises updating previously stored formatting information stored in the information storage smart card, and the updating previously stored formatting information comprises at least one of the following: updating decryption information; and updating general formatting information.

36. A method for downloading a document via a communications medium attached to a communications interface, the method comprising:

receiving, via a communications network, an authorization to receive the document via the communications medium;

placing an information storage smart card in removable operative association with the communications interface;

receiving the document from the communications medium; and conditionally transmitting the document, in accordance with the authorization, from the communications interface to the information smart card and storing the information in the information storage smart card, wherein the storing comprises updating previously stored formatting information stored in the information storage smart card, and the updating previously stored formatting information comprises at least one of the following: updating decryption information; and updating general formatting information.

37. A method according to claim 36 and wherein the step of receiving an authorization comprises performing an authentication method.

38. A method according to claim 37 and wherein the authentication method comprises a zero-knowledge authentication method.

39. A method according to claim 38 and wherein the zero-knowledge authentication method comprises a Fiat-Shamir authentication method.

40. A document downloading system for downloading a document via a communications medium operatively associated with a communications interface, the system comprising:

document receiving apparatus for receiving the document from the communications medium; and a document transmission module adapted to receive an information storage smart card in removable operative association therewith and to conditionally transmit the document to the information storage smart card for storage therein, wherein the storage in the information storage smart card comprises updating previously stored formatting information stored therein, and the updating previously stored formatting information comprises at least one of the following: updating decryption information; and updating general formatting information.

41. A document downloading system for downloading a document via a communications medium attached to a communications interface, the system comprising:

document receiving apparatus for receiving the document from the communications medium;

a document transmission module adapted to receive an information storage smart card in removable operative association therewith and to transmit the document to the information storage smart card for storage therein;

an auxiliary card module adapted to receive an auxiliary card in removable operative association therewith; and utilization apparatus for utilizing the document stored in the information storage smart card, wherein the storage in the information storage smart card comprises updating previously stored formatting information stored therein, and the updating previously stored formatting information comprises at least one of the following: updating decryption information; and updating general formatting information.

42. A document downloading system for downloading a document via a communications medium attached to a communications interface, the system comprising:

authorization apparatus for receiving, via a communications network, an authorization to receive the document via the communications medium; and a document transmission module adapted to receive an information storage smart card in removable operative association therewith and to transmit the document, in accordance with the authorization, to the information storage smart card for storage therein, wherein the storage in the information storage smart card comprises updating previously stored formatting information stored therein, and the updating previously stored formatting information comprises at least one of the following: updating decryption information; and updating general formatting information.

43. A method for downloading a document via a communications medium operatively associated with a communications interface, the method comprising:

receiving the document from the communications medium;

placing an information storage smart card in removable operative association with the communications interface;

conditionally transmitting the document from the communications interface to the information storage smart card and storing the document in the information storage smart card, wherein the conditionally transmitting step comprises comparing a price associated with the document to a spending limit and transmitting the document only if the price is in accordance with the spending limit;

placing an auxiliary card comprising an authorization card in removable operative association with the information access device; and utilizing the document in the information storage smart card only if the authorization card is authorized to access the document, wherein the document stored in the information storage smart card comprises a plurality of stored documents, and the utilizing step comprises utilizing at least one of the plurality of stored documents only if the authorization card is authorized to access the at least one of the plurality of stored documents, and the plurality of stored documents comprises a plurality of versions of a single document, and each one of the plurality of versions is encrypted according to at least one encryption parameter which differs for each one of the plurality of versions.

44. A method according to claim 43 and wherein the document comprises at least one of the following: text; graphics; sound; an animated scene; multimedia information; hypertext information; navigation information; a map; a book; a periodical; and a game.

45. A method according to claim 43 and also comprising the step of sending a message from the information storage smart card to an information storage facility, wherein the message comprises at least one of the following: a request for information; and status information.

46. A method according to claim 45 and wherein the message comprises an encrypted message.

47. A method according to claim 46 and wherein the message comprises a signed message.

48. A method according to claim 43 and wherein the conditionally transmitting step comprises transmitting the document to the information storage smart card only if the authorization smart card is authorized to access the item of information.

49. A method according to claim 43 and wherein the information storage smart card is paired with the communications interface.

50. A method according to claim 43 and also comprising: removing the information storage smart card from operative association with the communications interface; placing the information storage smart card in operative association with an information access device; and utilizing the document stored in the information storage smart card with the information access device.

51. A method according to claim 50 and wherein the information access device comprises at least one of the following: a document display device; a personal computer; a personal communications device; a personal display device; a television; a radio; a sound system; and a guidance system.

52. A method according to claim 50 and wherein the utilizing step comprises conditionally utilizing the document.

53. A method according to claim 50 and wherein the utilizing step comprises formatting the document.

54. A method according to claim 53 and wherein the formatting step comprises formatting based on formatting information stored in the information storage smart card.

55. A method according to claim 54 and wherein the formatting information is comprised in the document.

56. A method according to claim 54 and wherein the formatting information comprises decryption information.

57. A method according to claim 53 and wherein the formatting step comprises formatting based on formatting information stored in the information access device.

58. A method according to claim 57 and also comprising updating the formatting information based on formatting update information stored in the information storage smart card.

59. A method according to claim 43 and wherein the conditionally transmitting step comprises transmitting the information to the information storage smart card only if the information storage smart card is authorized for use in the communications interface.

60. A method according to claim 43 and wherein the conditionally transmitting step comprises transmitting the document to the information storage smart card only if the information storage smart card is authorized to receive the document.

61. A method according to claim 43 and wherein the conditionally transmitting step comprises transmitting the document to the information storage smart card upon external authorization.

62. A method according to claim 43 and wherein said document is associated with a geographical region, and the conditionally transmitting step comprises transmitting the document to the information storage smart card if the information storage smart card is associated with the geographical region.

63. A method according to claim 43 and wherein said document is associated with a geographical region, and the conditionally transmitting step comprises preventing transmission of the document to the information storage smart card if the information storage smart card is associated with the geographical region.

64. A method according to claim 63 and wherein the document comprises authorization information comprising information indicating whether the information storage smart card is authorized to use the document.

65. A method according to claim 64 and wherein the conditionally transmitting step comprises transmitting the information to the information storage smart card only if the information storage smart card is authorized to use the document in accordance with the authorization information.

66. A method according to claim 43 and wherein the storing comprises updating previously stored information stored in the information storage smart card.

67. A method according to claim 66 and wherein the updating step comprises at least one of the following: replacing the previously stored information; changing the previously stored information; deleting the previously stored information; and supplementing the previously stored information.

68. A method according to claim 66 and wherein the formatting step comprises at least one of the following: updating decryption information; and updating general formatting information.

69. A method according to claim 43 and wherein the authorization card comprises an authorization smart card.

70. A method according to claim 43 and wherein the document comprises parental control information, and the conditionally transmitting comprises transmitting only in accordance with the parental control information.

71. A method according to claim 70 and wherein the parental control information is associated with only a portion of the document, and the conditionally transmitting step comprises transmitting the portion of the document only in accordance with the parental control information.

72. A method for downloading a document via a communications medium operatively associated with a communications interface, the method comprising:

receiving the document from the communications medium;

placing an information storage smart card in removable operative association with the communications interface;

conditionally transmitting the document from the communications interface to the information storage smart card and storing the document in the information storage smart card;

removing the information storage smart card from operative association with the communications interface;

placing the information storage smart card in operative association with an information access device; and utilizing the document stored in the information storage smart card with the information access device, wherein the utilizing step comprises formatting the document, and the formatting comprises formatting based on formatting information stored in the information storage smart card, and the formatting information comprises decryption information.

73. A method for downloading a document via a communications medium operatively associated with a communications interface, the method comprising:

receiving the document from the communications medium;

placing an information storage smart card in removable operative association with the communications interface;

conditionally transmitting the document from the communications interface to the information storage smart card and storing the document in the information storage smart card;

removing the information storage smart card from operative association with the communications interface;

placing the information storage smart card in operative association with an information access device; and utilizing the document stored in the information storage smart card with the information access device, wherein the utilizing step comprises formatting the document, and the formatting step comprises formatting based on formatting information stored in the information access device, and the method also comprises:

updating the formatting information based on formatting update information stored in the information storage smart card.

74. A method for downloading a document via a communications medium operatively associated with a communications interface, the method comprising:

receiving the document from the communications medium;

placing an information storage smart card in removable operative association with the communications interface; and conditionally transmitting the document from the communications interface to the information storage smart card and storing the document in the information storage smart card, wherein said document is associated with a geographical region, and the conditionally transmitting step comprises transmitting the document to the information storage smart card if the information storage smart card is associated with the geographical region.

75. A method according to claim 74 and wherein the document comprises authorization information comprising information indicating whether the information storage smart card is authorized to use the document.

76. A method according to claim 75 and wherein the conditionally transmitting step comprises transmitting the document to the information storage smart card only if the information storage smart card is authorized to use the document in accordance with the authorization information.

77. A method for downloading a document via a communications medium operatively associated with a communications interface, the method comprising:

receiving the document from the communications medium;

placing an information storage smart card in removable operative association with the communications interface; and conditionally transmitting the document from the communications interface to the information storage smart card and storing the document in the information storage smart card, wherein said document is associated with a geographical region, and the conditionally transmitting step comprises preventing transmission of the document to the information storage smart card if the information storage smart card is associated with the geographical region.

78. A method according to claim 77 and wherein the document comprises authorization information comprising information indicating whether the information storage smart card is authorized to use the document.

79. A method according to claim 78 and wherein the conditionally transmitting step comprises transmitting the document to the information storage smart card only if the information storage smart card is authorized to use the document in accordance with the authorization information.

80. A method for downloading a document via a communications medium operatively associated with a communications interface, the method comprising:

receiving the document from the communications medium;

placing an information storage smart card in removable operative association with the communications interface; and conditionally transmitting the document from the communications interface to the information storage smart card and storing the document in the information storage smart card, wherein the document comprises parental control information, and the conditionally transmitting comprises transmitting only in accordance with the parental control information.

81. A method according to claim 80 and wherein the parental control information is associated with only a portion of the document, and the conditionally transmitting step comprises transmitting the portion of the document only in accordance with the parental control information.

* * * * *

UNITED STATES PATENT AND TRADEMARK OFFICE
CERTIFICATE OF CORRECTION

PATENT NO. : 6,298,441 B1
DATED : October 2, 2001
INVENTOR(S) : Doron Handelman et al.

It is certified that error appears in the above-identified patent and that said Letters Patent is hereby corrected as shown below:

<u>Title page,</u>
Item [30], "IS" should read -- IL --.

Signed and Sealed this

Ninth Day of April, 2002

Attest:

Attesting Officer

JAMES E. ROGAN
Director of the United States Patent and Trademark Office